(12) United States Patent
Isidore et al.

(10) Patent No.: US 7,912,497 B2
(45) Date of Patent: Mar. 22, 2011

(54) SINGLE WIRELESS COMMUNICATION DEVICE WITH MULTIPLE, CONCURRENT SUBSCRIBER NUMBER CAPABILITY

(76) Inventors: Eustace P. Isidore, Austin, TX (US); Nesia E. Warner, Austin, TX (US)

( * ) Notice: Subject to any disclaimer, the term of this patent is extended or adjusted under 35 U.S.C. 154(b) by 759 days.

(21) Appl. No.: 11/375,892

(22) Filed: Mar. 15, 2006

(65) Prior Publication Data
US 2006/0234693 A1  Oct. 19, 2006

Related U.S. Application Data

(60) Provisional application No. 60/665,136, filed on Mar. 25, 2005.

(51) Int. Cl.
*H04M 1/00* (2006.01)
*H04Q 7/20* (2006.01)
(52) U.S. Cl. .................. 455/552.1; 455/127.4; 455/558
(58) Field of Classification Search ............... 455/127.4, 455/551, 552.1, 558
See application file for complete search history.

(56) References Cited

U.S. PATENT DOCUMENTS
2007/0099638 A1 *  5/2007  Voltz .......................... 455/500

FOREIGN PATENT DOCUMENTS
JP  2003-189361  *  4/2003

\* cited by examiner

*Primary Examiner* — Lee Nguyen
(74) *Attorney, Agent, or Firm* — Dillon & Yudell LLP

(57) ABSTRACT

A wireless communication device, a method, and a computer program product that enable multiple subscriber numbers to be concurrently assigned to and supported within a single communication device, such as a wireless/cellular phone. The communication device is designed with circuit components and logic that allows two or more subscriber numbers to be concurrently programmed into the device. Each subscriber number is individually supported, with the logic also providing some overlapping functionality. A user selectively utilizes one of the subscriber numbers to originate a new call out and/or accept an incoming call to that subscriber number and may toggle between subscriber numbers to communicate on.

38 Claims, 13 Drawing Sheets

DUAL FOR DUAL NUMBER

DUAL NUMBER SINGLE

SINGLE WIRELESS COMMUNICATION DEVICE WITH MULTIPLE, CONCURRENT SUBSCRIBER NUMBER CAPABILITY

CLAIM OF PRIORITY

The present invention claims priority from Provision Patent Application, No. 60/665,136, titled "Multiple Number Single Device (MNSD) Wireless Phone" and filed on Mar. 25, 2005. The entire content of that Application is incorporated herein by reference.

BACKGROUND OF THE INVENTION

1. Technical Field

The present invention relates generally to wireless devices and more specifically to wireless telecommunications devices. Still more particularly, the present invention relates to a wireless telecommunications device with multiple subscriber numbers and method for designing, configuring, and utilizing the same.

2. Description of the Related Art

Wireless communication is growing at a tremendous pace. Wireless (or cellular) phone use, in particular, has been escalating in most countries across the world. Having an individual cell phone is becoming almost a necessity in major cities. Having a cellular phone enables a person to be reachable/accessible for communication by clients, co-workers, family, and others with the device's phone number. A cellular phone also provides the user the flexibility of remaining in/initiating phone communication at all times, regardless of his/her geographic/physical location.

In today's business world, a cellular phone is becoming a required business tool, and many companies provide their employees or executives with a wireless phone for business use. Other employees may simply purchase the phone themselves having recognized the importance of having a business point of contact while out of the (oftentimes virtual) office. This is particularly true in the mobile business world where business people conduct business while out of the traditional office and thus have to carry around a business cellular phone (or other mobile devices, such as a PDA or Blackberry with cellular phone capabilities) to conduct business on the go. Occasionally, also, a business person may work for (or own) more than one business, thus requires a separate cellular phone for each business.

In addition to the escalating business use of cellular phones, an even larger segment of the global population utilizes cellular phones for personal use. Typically, most users of cellular phones purchase a personal cell phone that is used for personal calls. When these users are also business men/women, the user may purchase a separate phone device (or receive one form their business), which is a business cellular phone utilized solely/primarily for business. Thus, it is not uncommon for a business person to have two cellular phones, a first business phone dedicated to business calls and a second personal phone utilized for personal calls (or alternatively, a second business phone when the person works for (or owns) two businesses). Each phone has a different number and may be provided by different service providers (e.g., Sprint®, AT&T®, Cingular®, TMobile®). Having two phones is necessary when the business phone is dedicated solely for business use only, and the person desires to have a separate means of wireless communication with other non-business contacts (family, friends, etc.). For example, in some instances, when the cellular phone is owned or controlled by the business, the business promulgates specific rules and restrictions on the utilization of the business phone for anything other than business-related calls.

Additionally, certain business calls are required to be expensed to a client or the business unit. When a single phone (i.e., phone number) is utilized for both personal and business calls, the task of expensing calls become increasingly more difficult and involves tedious analysis of the calls made and received to separate out personal calls, average the cost of the calls across the ratios of personal to business calls and other calculations. For most business persons, the headaches of performing this monthly calculation leads them to obtain and carry around two phones, with one dedicated solely to business calls so that the monthly task of expensing calls becomes substantially easier.

Travelers to different countries, whether on business or pleasure, frequently desire to have a local phone number while away. Today, obtaining a local cellular number in another country requires either a purchase of a new cell phone configured with a local number for that country or purchase of a local number subscriber identity module (SIM) (interchangeably referred to hereinafter as both SIM and subscriber module) to insert into the user's cellular phone. For example, with ("unlocked") Global System for Mobile Communication (GSM) phones or phones that require an insertable/removable subscriber module to operate, the user may utilized his current cellular phone, but has to replace the subscriber module (with the home location's telephone number—"home module") with a subscriber module obtained in that foreign country ("foreign module"). Because most countries outside of the United States operate a GSM-based cellular phone system, which requires insertion of a SIM in the cellular phone/wireless device, cell phone users are familiar with the use of relatively-inexpensive, local-number SIMs when traveling outside of the United States.

For users whose personal phone is a quad band or higher band GSM-configured device, obtaining the local number simply involves removing the home module and replacing it with the foreign module having the local foreign number. However, once the home module is removed, no calls being made to the cellular number of the person's home module can be received on the cellular phone. When the home module contains the business number, the user effectively shuts down/off his business number. For most business persons who wish to continue conducting business across national boundaries with the business number, but who also wants access to a local foreign number (perhaps to conduct local business transactions without incurring the substantial costs of inter-territorial cellular fees), this is not a desired outcome. Even more worrisome, however, is the ease at which the subscriber module may be lost or misplaced once removed from the cellular phone. Thus, removing the subscriber module of a business number (or personal number, for that matter) may lead to much angst and significant costs if the SIM card has to be replaced on return to the person's home country.

Thus, most business travelers opt to purchase (or rent) another cellular phone that is utilized for supporting the foreign local number, while keeping their separate personal/business phone. Notably, for persons with CDMA-configured devices in the United States (e.g., those persons using Sprint or other CDMA carriers), accessing wireless/cellular communication outside of the United States requires purchase of a new GSM-capable device in the foreign country.

Having to carry around and communicate over two separate cellular phones with two different numbers is cumbersome and may occasionally lead to confusion. For example, when the personal phone rings while on the business phone, there is no automatic way to mute the rings from the personal phone while completing the business call on the business phone. When the calls are received in the reverse (personal then business), the person may have to ask the personal caller to hold on while answering the business call on the business phone, risking the personal caller overhearing the business conversation. Measures to locate the other phone, mute or answer the other phone, and transition from one phone to another requires some ambidexterity, perhaps while conducting an important business conversation.

SUMMARY OF THE INVENTION

Disclosed are a wireless communication device, a method, and a computer program product that enable multiple subscriber numbers to be concurrently assigned to and supported within a single communication device, such as a wireless/cellular phone. The communication device is designed with circuit components and logic that allows two or more subscriber numbers to be concurrently programmed into the device. Each subscriber number is individually supported, with the logic also providing some overlapping functionality. A user selectively utilizes one of the subscriber numbers to originate a new call out and/or accept an incoming call to that subscriber number and may toggle between subscriber numbers to communicate on.

The multiple subscriber numbers co-exist on a single wireless communication device. Specific multiple number single device (MNSD) hardware and firmware and software are provided to bridge communications between the circuit components that enable wireless communications by respective subscriber numbers. An MNSD utility controls which circuit components are utilized for connecting a cellular phone communication, where specific, different circuit components are assigned to support communication by the specific subscriber number.

The communication device has an external casing with a display screen and alphanumeric keypad. In one embodiment, the circuit components of the various numbers are fabricated/coupled to a single chassis, while in another embodiment, one or more each of the different sets of circuit components (for the different subscriber numbers) is fabricated on a different chassis within the device with both chasses coupled to a central processing module. In each case, the chassis or chasses are placed within the exterior casing that provides the interface mechanism for a user to access the communication features of the device. The interface mechanism comprises a graphical user interface and a numeric keypad.

When each subscriber number has a different set of circuit components, both sets may comprise a different antenna, such that multiple antennae exist within (or extrude from) the exterior casing. A first wireless circuit provides a first subscriber (cellular) number, and a second (or subsequent) circuit(s) provides a second, third, or higher-number cellular phone number(s). With the above configuration of multiple (i.e., two or more) wireless circuits, the user of the single device is provided multiple subscriber numbers for independent utilization, rather than having two or more conventional (single-number) cell phones.

Additionally, in one embodiment, the communication device has one or more buttons that enable a user to physically switch on (or off) or toggle between which one of the wireless circuits (and/or associated number) the user desires to use. In one embodiment, the button(s) are located on the side of the phone and provide a visual indication (on the device's display screen) to the user which number is currently active (and/or inactive). In another embodiment, selection of the phone numbers and switching on and off are controlled by a menu selection enabled by the MNSD utility.

The MNSD utility includes the software logic (e.g., in the form of instruction code) that enables all of the functionality of a MNSD phone. Several of these functionality are provided by selectively displaying a menu function that, when selected by the user, provides a graphical user interface (GUI) for: (1) enabling set-up of the various numbers on the cellular phone; (2) enabling set-up/selection of a primary number from among the available numbers; (3) enabling/disabling particular ones of the numbers (useful when traveling outside of usage area for a number to avoid roaming and other charges or interference with different frequency signals when in another country, for example); and (4) setting up call waiting; voicemail; and other phone options for each number individually and/or relative to each other. In one embodiment, the displayed menu option may be for the subscriber number that is currently active.

The MNSD utility also allows the user to program different rings for each number so that the rings are distinguishable to the user, who can easily make an association of whether a call is business or personal based on the audible ring. The user does not have to physically pick up and view the phone (or run to the phone if located at a distance away) to know if the call being received is a business call or a personal call or a call to a first business or a second business. The user may thus elect not to answer a particular type (business or personal) call based on the type of ring.

The MNSD utility also displays via the (GUI on the) display device an indication of which particular phone number is currently being utilized or is set as a primary number. The MNSD utility also enables a call waiting functionality, whereby an incoming call on a first/primary (or second/secondary) number is indicated on the display device along with a specific notification to which subscriber number the incoming call is being received for. In this way, an incoming call on the same subscriber number would be distinguished from an incoming call on the other subscriber number. This enables the user to selectively determine whether to answer the incoming call.

For simplicity, the description of the invention shall focus on a single device with two numbers, i.e., a dual number single device (DNSD) cellular phone, although the functionality provided by the invention is applicable to (any number) multiple number single device (MNSD) cellular phone. When the cellular phone supports two different numbers, one number is considered a primary number and the other number a secondary number. The primary number designation allows that number to be given priority when access to both numbers is being arbitrated for.

In one embodiment also, each subscriber number of the DNSD cellular phone is Global System for Mobile Communication (GSM)-based, leading to a nomenclature that identifies the type of cellular system supported by the subscriber numbers, (e.g., DNSD-G2 cellular phones). With a DNSD-G2 phone, the first subscriber number (which may be associated with a first GSM-based circuit or circuit components, where multiple circuits are provided) is programmed within a first subscriber module that is inserted into a corresponding card slot on the circuit board. The second subscriber number, likewise associated with a second GSM-based circuit is programmed on a second subscriber module that is placed in a second card slot on the circuit board.

One embodiment of the invention also provides a single combined-circuit in which a single enhanced GSM-based circuit provides two card slots for individual plug-in of the first and second subscriber modules. Notably, with either implementation, the cellular device does not have to contain both subscriber modules (or programmed with both subscriber numbers), as the device is fully functional as a single subscriber number device (as with conventional devices). The user may, however, choose to provide the second subscriber number on the same device by simply activating a second service and inserting a second subscriber module into the next card slot.

In yet another embodiment, a single, multiple-number subscriber module that is itself programmed to provide support multiple numbers concurrently may be inserted within the cellular device.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Disclosed are a wireless communication device, a method, and a computer program product that enable multiple subscriber numbers to be concurrently assigned to and supported within a single communication device, such as a wireless/cellular phone. For simplicity of description, the communication device shall be hereinafter described as a cellular phone. However, those skilled in the art appreciate that the described features of the invention and equivalents thereof are applicable to other types of wireless/cellular communication devices. That is, various types of wireless devices are currently utilized to provide wireless communication and these devices may be referred to by a different name (other than a cell phone). For example, wireless device may be a Blackberry®, PDA, mobile computer, smart-phone, and the like.

Generally, the communication device is designed with circuit components and logic that allows two or more subscriber numbers to be concurrently programmed into the device. Each subscriber number is individually supported, with the logic also providing some overlapping functionality. A user selectively utilizes one of the subscriber numbers to originate a new call out and/or accept an incoming call to that subscriber number and may toggle between subscriber numbers to communicate on.

The multiple subscriber numbers co-exist on a single wireless communication device. Specific multiple number single device (MNSD) hardware and firmware and software are provided to bridge communications between the circuit components that enable wireless communications by respective subscriber numbers. An MNSD utility controls which circuit components are utilized for connecting a cellular phone communication, where specific, different circuit components are assigned to support communication by the specific subscriber number.

Within the description below, like elements are provided like numbers, while similar elements that are unique within a later figure are provided a different leading numeral (e.g., 1xx, 2xx). The specific illustrations and descriptions thereof are however meant solely for illustration and are not meant to imply any limitations on the invention, which is applicable to the disclosed embodiments and any/all equivalents thereof. Sectional headings are provided to delineate sections within the overall flow of the description. These headings are not meant to be limiting on the invention and do not restrict the description in the particular section to solely those features associated with or suggested by the specific headings.

DNSD (MNSD) Hardware Configuration

Figure 1A:
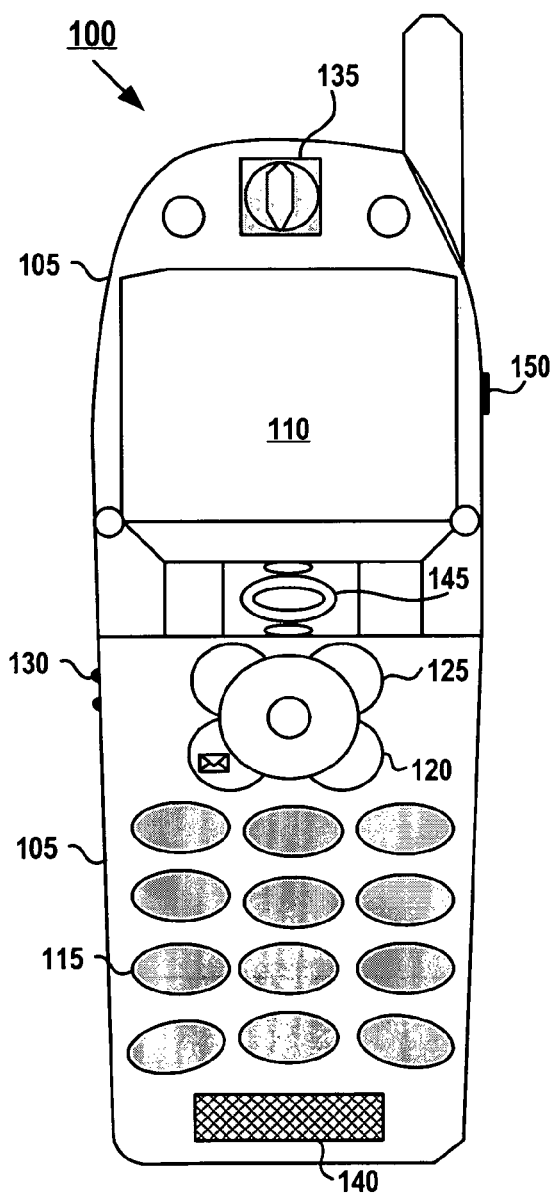
FIGS. 1A and 1B are a frontal and side schematic view of an exemplary cellular phone with which multiple-number single-device (MNSD) functionality may be provided according to one embodiment of the present invention.
Figure 1B:
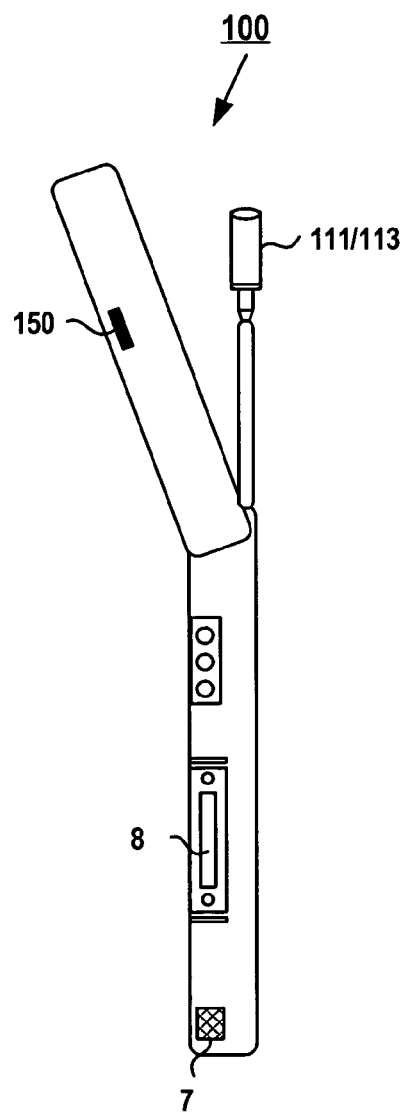

With reference now to the Figures, and in particular with reference to FIGS. 1A-1B, which illustrate a front and side exterior view of an example MNSD cellular phone according to embodiments of the invention. As stated above, MNSD wireless communication devices are illustrated and described as cellular phones (particularly DNSD cell phones 100).

For simplicity, the description of the invention shall focus on a single device with two numbers, i.e., a dual number single device (DNSD) cellular phone, although the functionality provided by the invention is applicable to (any number) multiple number single device (MNSD) cellular phone. When the cellular phone supports two different numbers, one number is considered a primary number and the other number a secondary number. The primary number designation allows that number to be given priority when access to both numbers is being arbitrated for.

Further, embodiments of the present invention will be described with reference to the Global System for Mobile Communication (GSM)-based cell phones (i.e., phones operating under/via GSM communication standards). However, the described features of the invention are not limited to these specific embodiments. The transmission system may be CDMA or TDMA, for example, other than GSM, and besides cell phones, mobile terminals supporting voice communication may be used. Additionally, the following described embodiments are suitable for mobile phones compatible with both a voice communication mode, in which a relatively small amount of data is used, and a data communication mode, in which the amount of data is likely to be large.

FIG. 1A illustrates the exterior view of DNSD cell phone 100, which comprises similar components as several conventional cell phones. For example, DNSD cell phone 100 comprises external casing 105, display screen 110, alphanumeric keypad 115, function buttons 120, select buttons 125, side control buttons 130, and others. DNSD cell phone 100 also comprises speaker 135, microphone 140, and camera lens 145. Additionally, in the illustrative embodiment, DNSD cell phone 100 comprises subscriber number select (SNS) button 150 that enables a user to physically toggle between the various subscriber numbers available. SNS button 150 may be utilize to switch on (or off) or disable one of the wireless circuits (and associated subscriber number) via a sequence of steps illustrated at FIG. 3 and described below. In the illustrative embodiment, SNS button 150 is located on the side of the phone.

This side location is more clearly illustrated by FIG. 1B, which shows a side view of MNSD cell phone 100 with antennae 111/113 extended. While antennae 111/113 are illustrated as external antennae, the invention is equally applicable to configurations/designs that provide internal antennae and/or a single antenna that supports both subscriber numbers. SNS button 150 is illustrated at the middle, right side of the top portion of MNSD cell phone 100, however, it is understood that the location of SNS button 150 may vary from device to device. For example, one embodiment provides SNS button 150 as one of the select buttons 125, which doubles as "number select/switch" button when provided in that configuration. FIG. 1C illustrates an example embodiment of this configuration. FIG. 1C also illustrates a display screen 110 displaying both subscriber number 1 160 and subscriber number 2 162, according to one embodiment. FIG. 1C also illustrates SNS button 150 may be replaced by a selectable menu item, where the functionality of an SNS button is provided virtually.

Figure 3:
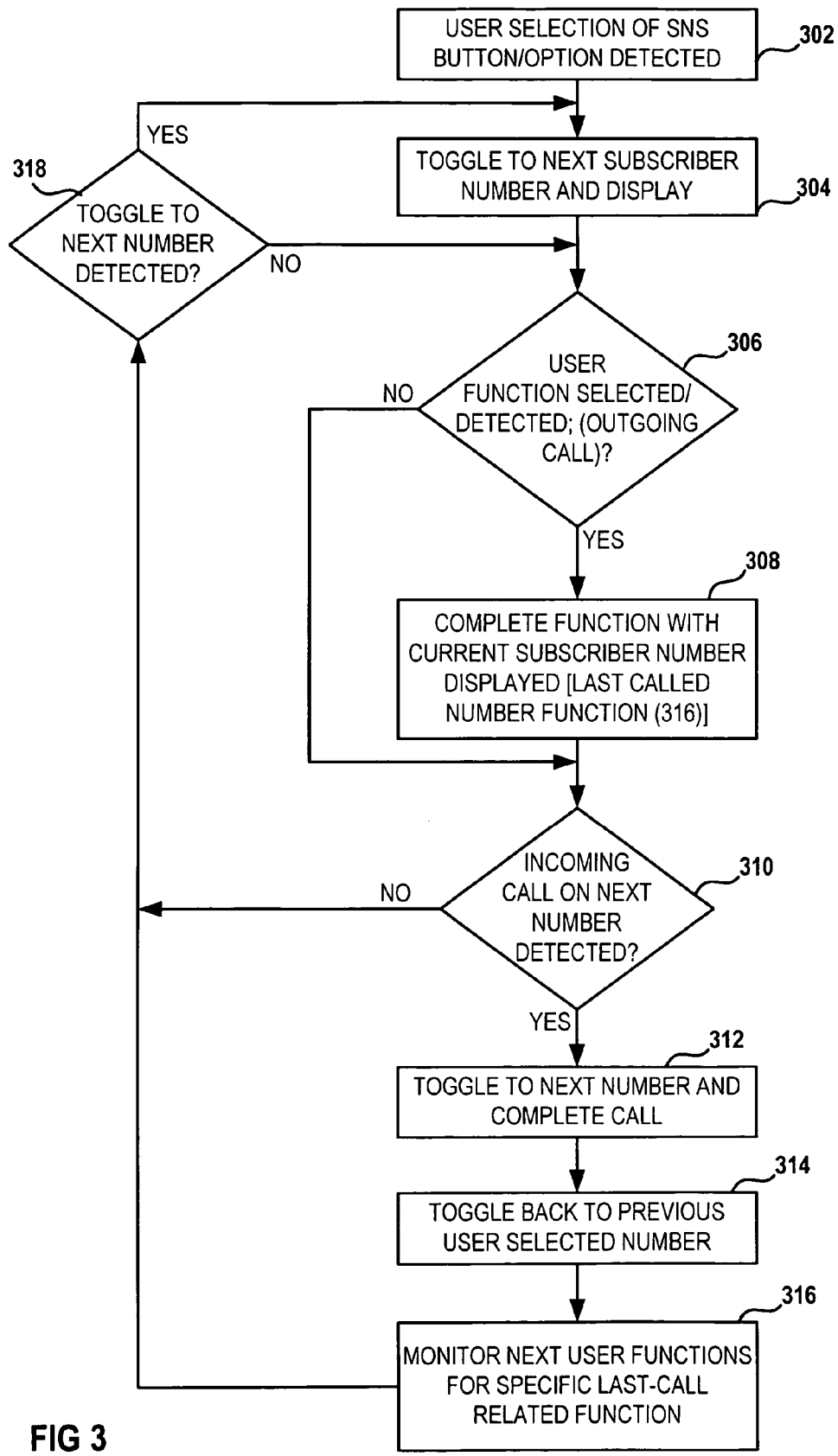
FIG. 3 is a flow chart of the process by which the user toggles between active and inactive subscriber numbers within a DNSD phone according to one embodiment of the invention.

FIG. 3 illustrates the process by which SNS button 150 or functionality associated with such a feature is completed. As shown by FIG. 3, when the user selects (or depresses) SNS button 150 (block 302), an internal function is activated to provide a visual indication on the display screen 110 (block 304) to the user which number is currently active (defaulted for further user action). Any user activity detected (at determination block 306) is conducted/carried out on the subscriber number that is currently active (and displayed), as shown at block 308.

Following a determination is made at block 310, whether an incoming call is received on the next number. When a call is received, the user is able to toggle to the next call as shown at block 312 and then toggle back to the original call, as indicated at block 314 using one of the toggle functions provided. Specific DNSD hardware/firmware/software is provided to bridge communications between the two circuits and control which one of the wireless circuits is being utilized for connecting a cellular phone transmission, etc.

A user select input causes selection logic to select between first subscriber number (represented by SIM 1 250) and second subscriber number (SIM 2 252), selectively turning one number on and the other number off. Of course, other embodiments are contemplated wherein both numbers are simultaneously "on" where the selection merely selects which one to enable the user to access.

Returning to FIG. 3, the next detected user functions are monitored for specific last-call related functions, as shown at block 316. If the user selects/depresses the SNS button 150 again (as determined at block 318), the next available number is displayed on display screen (block 304). In one embodiment, selection of the subscriber phone numbers and switching on and off and other available features are controlled by an internal MNSD/DNSD utility, described below.

Figure 2A:
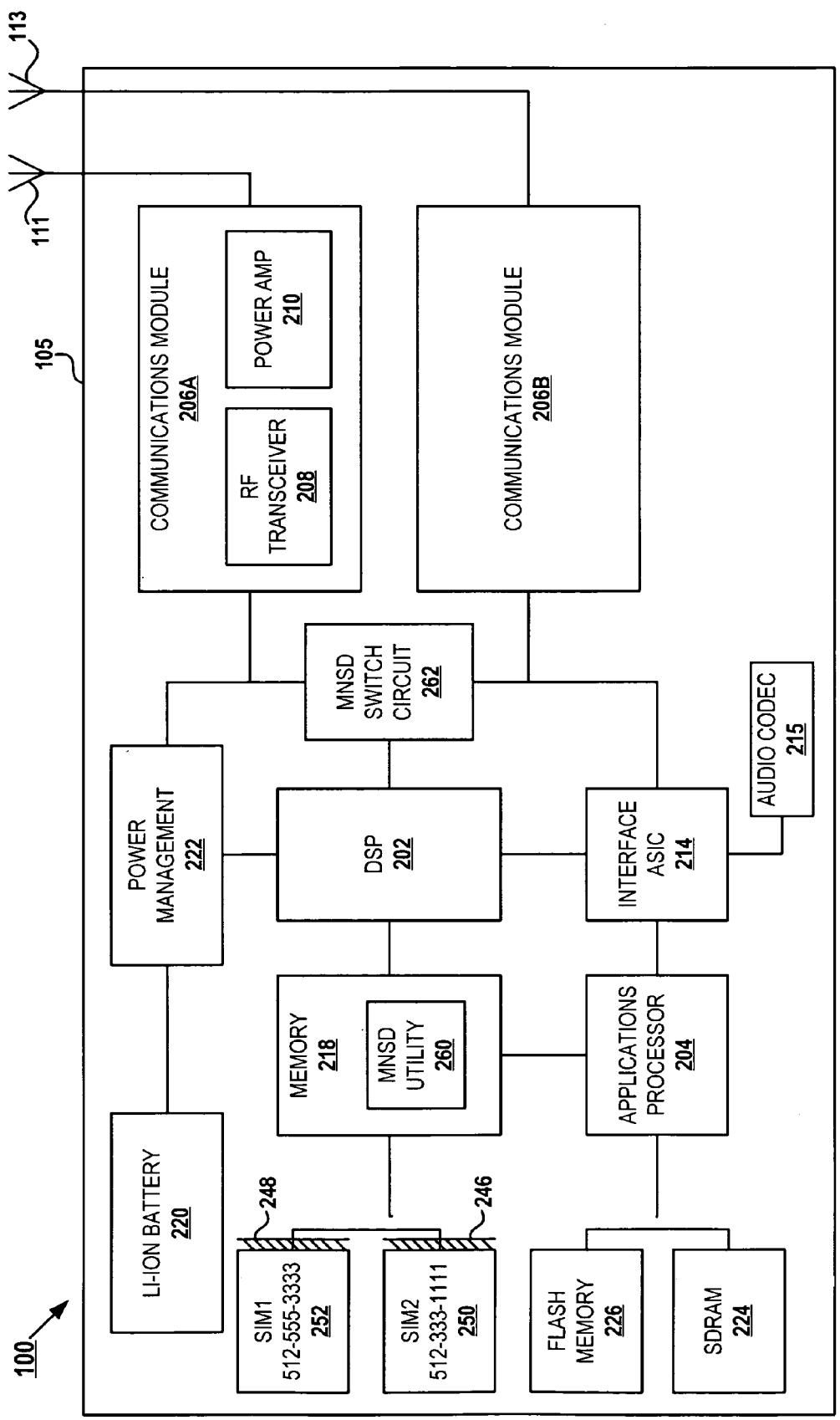
FIG. 2A is a block diagram representation of internal circuitry components of a MNSD phone according to one embodiment of the invention.
Figure 2B:
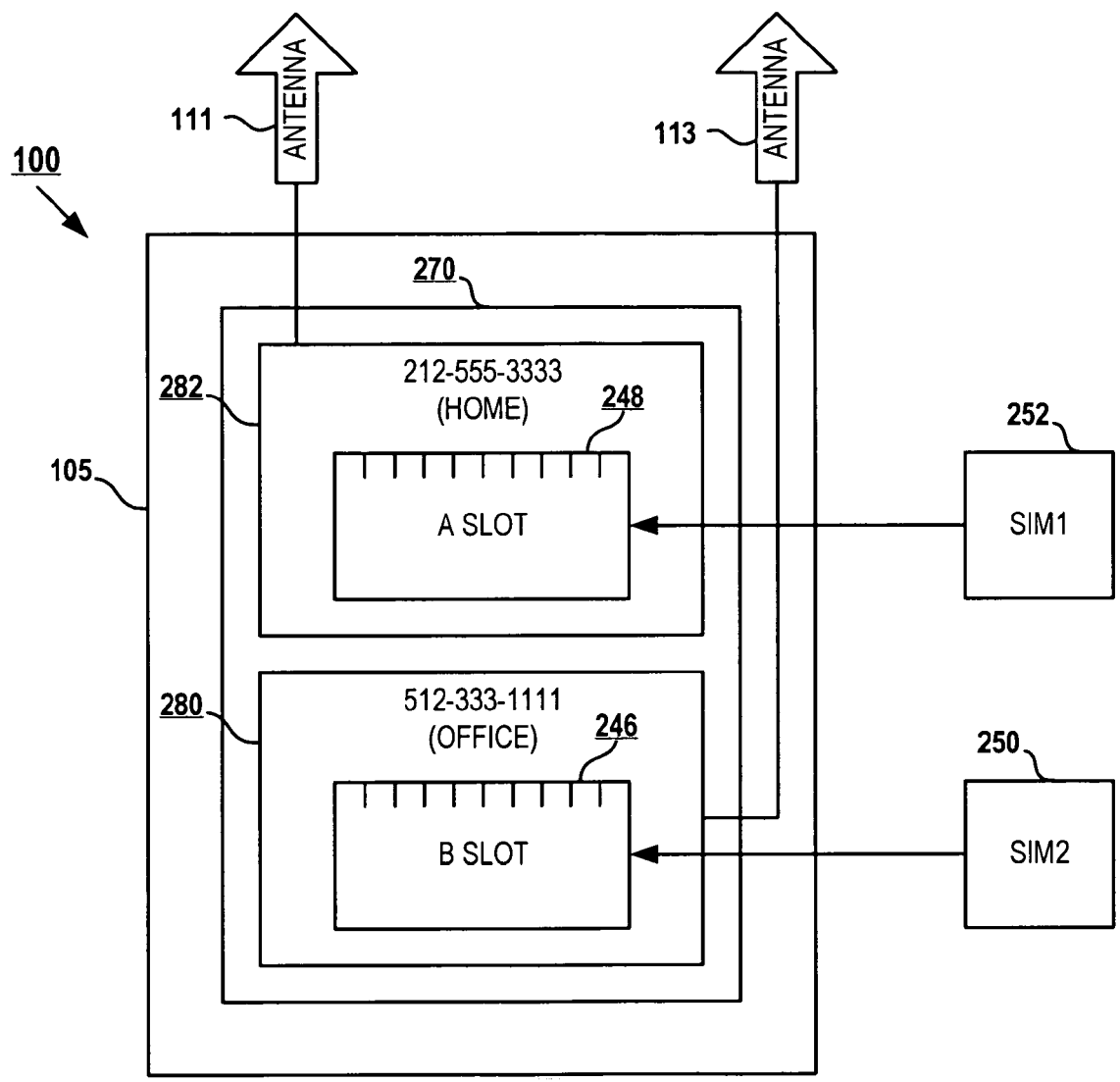
FIGS. 2B-2E are block diagrams illustrating different configurations of circuitry associated with two subscriber numbers provided within a DNSD cellular phone according to embodiments of the invention.
Figure 2C:
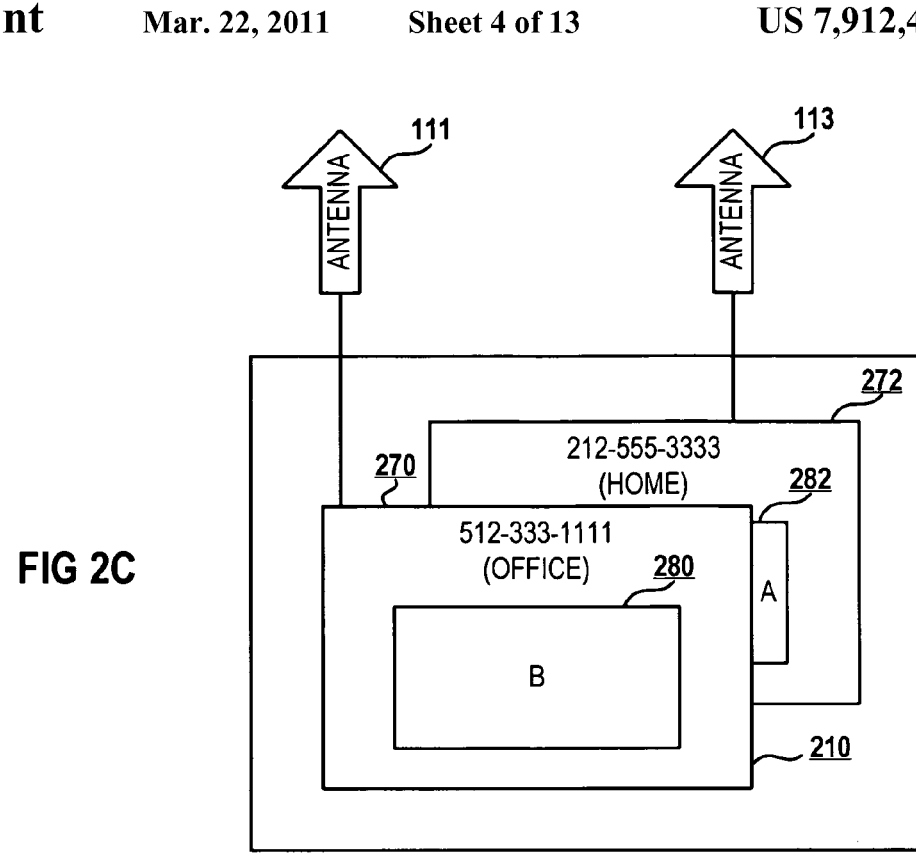
Figure 2D:
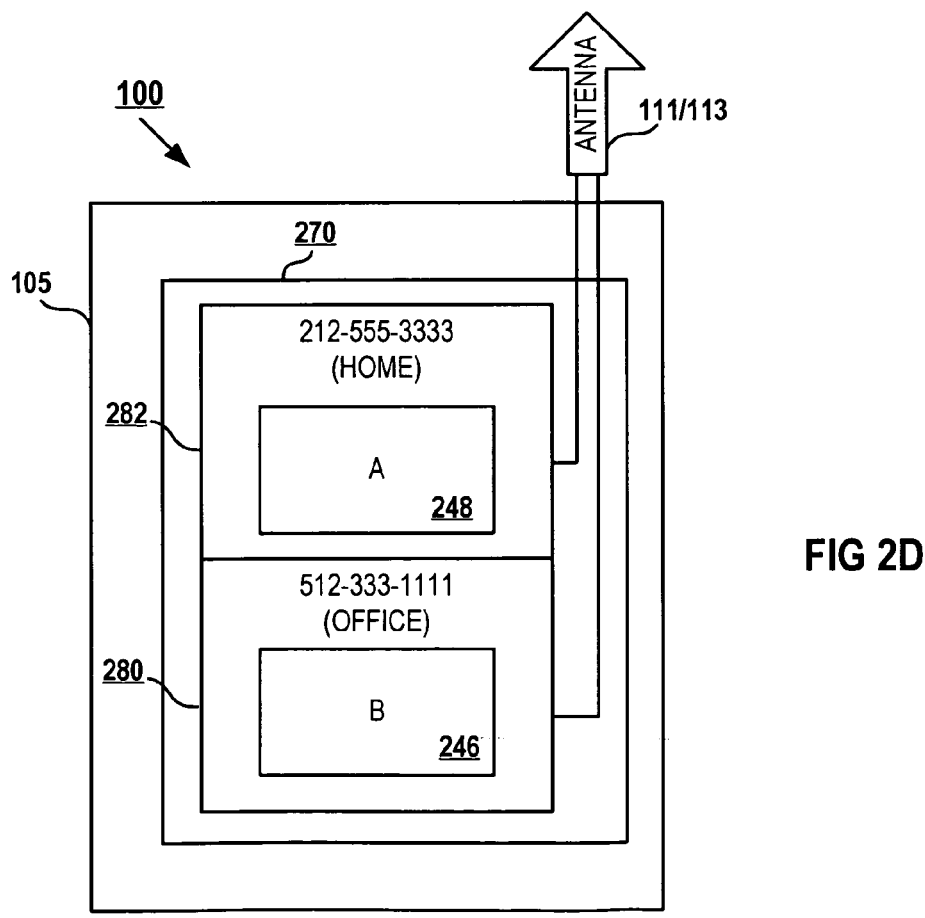

With reference now to FIGS. 2A-2E, there are provided multiple different configurations of the internal circuitry (or circuit components) of an example DNSD cell phone 100. In FIG. 2A, some basic circuit components are provided, while FIGS. 2B-2D illustrates the relative configuration (side-by-side/overlapping) of the circuits representing both subscriber numbers of a DNSD cell phone 100. Within the figures, like elements are occasionally numbered alike, with the addition of a subscripted alpha character to differentiate duplicate elements of the second circuit, (i.e., element 1XXa in circuit A, element 1XXb in circuit B).

The circuitry presented herein, particularly that illustrated by FIG. 2A is merely for illustration and covers only one type of circuit configuration for a cell phone. The invention is equally applicable to other configurations of cell phone devices, including existing configurations and other configurations that may be developed. Key among the configuration is the overlapping of control and other functions via an MNSD utility executing within the central processor.

Referring now to the figure, internal circuit of DNSD cell phone 100 comprises two circuits, circuit A 210 and circuit B 250 coupled to a central processor 145 via a DNSD switching facility 147 controlled by central processor 145. DNSD cell phone 100 comprises at its core a baseband digital signal processor (DSP) 202 for handling the cellular communication functions and an applications processor 204 on which the menu and other coded applications (e.g., an operating system) executes/runs.

Antennae 111 and 113 are respectively connected to communications module 206A and 206B, which in this embodiment, each support a respective subscriber number, as will be described further below. Example communications module 206A comprises circuitry for completing wireless communication (transmit and receive digital—voice and data—signals) via antenna 111, including for example, RF transceiver 208 and power amplifier module 210. In the illustrative embodiment, communications modules 206A/B are coupled to an MNSD switch circuit 262 that enables switching between one communications module or the next based on which subscriber number is currently active. DSP 202 is coupled to an interface ASIC 214 and an audio CODEC 216, which provide interfaces to a speaker, a microphone, and other input/output devices provided in the cell phone 100 such as a numeric or alphanumeric keypad (not shown) for entering commands and information.

DSP 202 uses a flash memory 218 for code store, and flash memory is enhanced with code for MNSD utility 260. In alternate embodiments, the code for MNSD utility 260 may be stored in (or distributed among) other storage modules within cell phone 100. Cell phone 200 is powered by Li-Ion (lithium-ion) battery 220, and a power management module 222 coupled to DSP 202 manages power consumption within cell phone 100. In one embodiment, power management is utilized to effectively shut down power to the circuit components/elements of the subscriber number not currently being utilized. When active communication is occurring on one subscriber number, the power management shuts down or causes the elements of the other subscriber number to go into a low power hibernation state to avoid any cross talk or interference. The response may be triggered by the MNSD utility which controls all multi-number functionality of the MNSD cell phone 100.

SDRAM 224 and flash memory 226 provide volatile and non-volatile memory, respectively, for applications processor 204. This arrangement of memory holds the code for the operating system, the code for customizable features such as the phone directory, and the code for any embedded applications software in the cell phone (perhaps including MNSD utility, in an alternate embodiment).

All of the above-described components are packaged within an appropriately designed external housing/casing 105. Other components may be present within cell phone 100 and alternatively, cell phone may comprise different configuration of components than those illustrated herein. For example, cell phone 100 may also include a visual display device (LCD display) with associated driver and a clock module. Interface mechanisms comprising a graphical user interface (via LCD display) and an alphanumeric keypad are appropriately designed to support the MNSD functionality.

As illustrated, rather than provide two separate circuits for each of the two subscriber numbers, the enhanced design of a MNSD phone utilizes a single element/component to support functional features that can be arbitrated for (i.e., selectively assigned to one or the other subscriber number. For example, a single battery, memory, flash memory, SDRAM, clock, and other elements may be provided to support both subscriber numbers. Overlapping elements reduces the size, power consumption, and efficiency of DNSD cell phone 100. Of course, alternate embodiments may be provided that separates the major processing, power and other functions for each subscriber number.

Advanced designs provide a single circuit with interconnected circuit components that support two or more numbers within a single complete circuit configuration. Regardless of the configuration of the multiple circuit elements, the circuits are each controlled by a central processor that links to the SIM cards (for GSM circuits, for example) and execute the code provided by a DNSD utility, described below.

As illustrated by FIGS. 2B-2E, the internal circuits are arranged in any one of a number of configurations, preferably selected to enable the least amount of circuit-to-circuit interference (or noise attenuation) given the desire for smaller, more-compact cellular phone devices. Thus, FIG. 2B illustrates one embodiment where the first and second subscriber number circuits are located in a vertical configuration relative to each other (i.e., one vertically above the other on a single circuit board, with/without overlap of main circuit components). FIG. 2C illustrates a second embodiment in which the circuits are arranged front and back of each other on separate circuit boards. With this configuration, a thin insulating barrier (or other method) may be provided to separate the main circuit components from each other and reduce cross-talk/noise effects as both circuits are operating.

As shown in FIG. 2B, in one embodiment, the circuit components are fabricated/coupled to a single chassis 270, with two sub-circuits 280/282 each providing specific support for one of the subscriber numbers and a card slot 246/248 for inserting respective SIMs 250/252. In another embodiment, as illustrated by FIG. 2C, a different set of circuit components are provided for each subscriber number and may be provided on separate chasses 270/275 within the cell phone 100. In each case, the chassis or chasses are placed within an exterior casing 105 that provides access to each SIM slot for insertion of a corresponding SIM for the subscriber number.

Figure 2E:
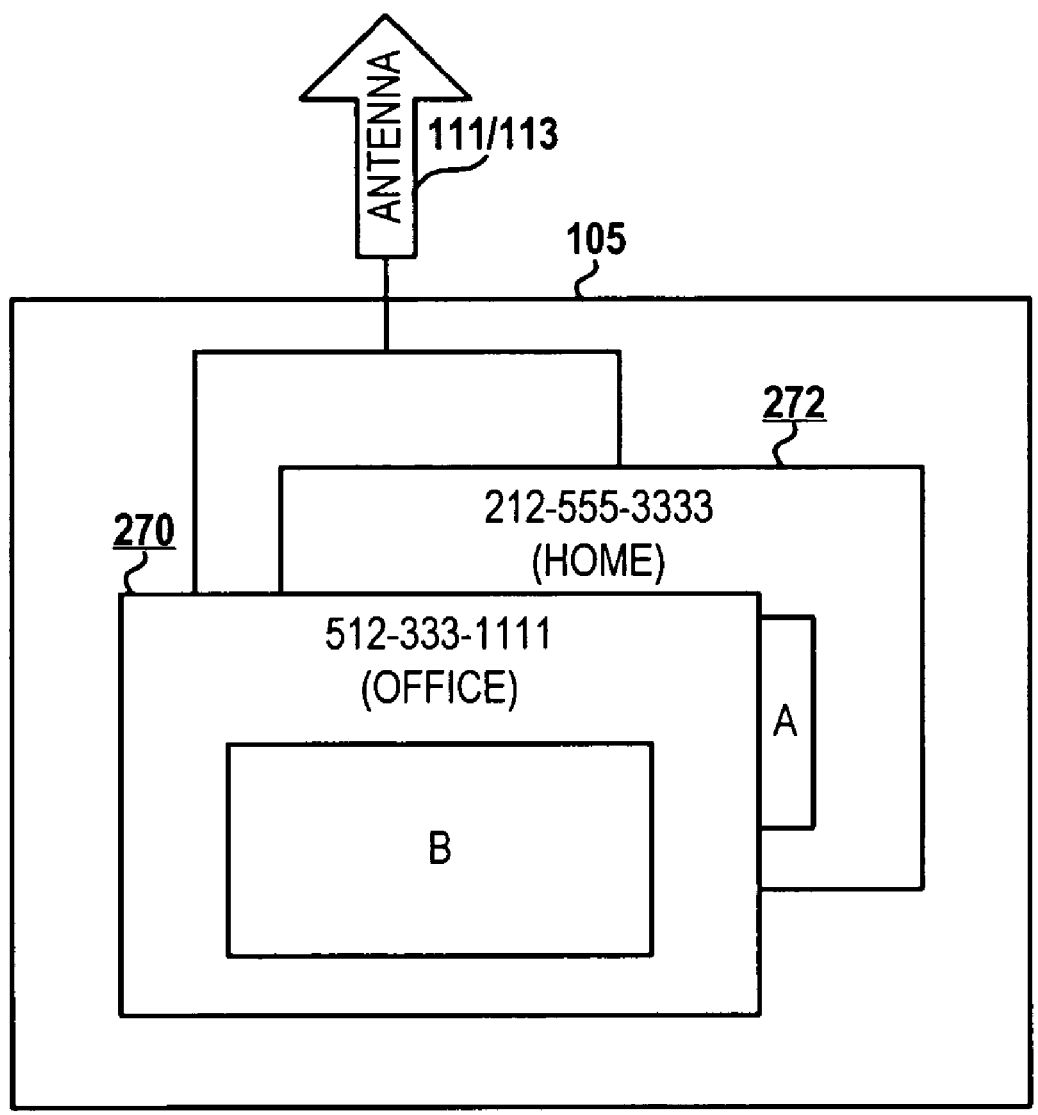

As further shown by FIGS. 2A, 2B and 2C when each subscriber number has a different set of circuit components, both subscriber numbers may complete their communications via a different antenna, such that multiple antennae are provided within cell phone, each supporting a particular subscriber number circuit. However, as illustrated by FIGS. 2D and 2E, alternate embodiments may be provided in which a single antenna is utilized to support wireless transceiver functions for both circuits.

The invention is applicable to both CDMA-configured and GSM-configured (or other wireless-configuration, e.g., TDMA) wireless devices, with different combinations of these types of wireless phone circuitry possible within each phone. Thus a DNSD wireless phone may comprise multiple CDMAs circuits (CDMA1-CDMA2), multiple GSM circuits (GSM1-GSM2) or some combination of CDMA and GSM wireless circuits (CDMA-GSM) or (GSM-CDMA), for example. Each type of circuit is programmed for subscriber numbers according to conventional programming methods. However, when both a CDMA and GSM circuit is provided within the DNSD phone, the GSM circuit receives its programming via a SIM, as described below. In one implementation, the CDMA-GSM DNSD cellular phone may only utilize one of the two transmission types at a time. Thus CDMA functionality is automatically placed in a hibernation-mode while a GSM connected call is in process, and vice versa. In another embodiment, exactly the converse may be implemented, whereby both a GSM-connected call and a CDMA-connected call are allowed simultaneously since both utilize different transmission medium.

For simplicity, certain embodiments of the invention are described with reference to a DNSD GSM1-GSM2 cellular phone (hereinafter DNSD-G2, representing the type of device (DNSD), the type of wireless circuitry and transmission network protocol (GSM) and the number of subscriber numbers supported (2)); However, the majority of the functional features provided with the description of this configuration are also applicable to the other possible types of paired wireless circuit configurations.

With DNSD-G2, the first subscriber number (perhaps associated with the first GSM-based circuit, where multiple circuits are utilized) is provided via a first SIM 250 inserted into a corresponding SIM slot/port 246/248. The second subscriber number, likewise associated with the second GSM-based circuit is provided by a second SIM 252. The invention also provides a single combined circuit embodiment in which a single enhanced GSM circuit provides two SIM ports for individual plug-in of a first and second SIM card (see FIG. 1). Notably, with either implementation, operation of one subscriber number on the cell phone does not require both subscriber numbers be activated within the phone, and the phone is fully functional as a single number device (as with conventional cell phones). A user of the DNSD phone may choose to provide a second subscriber number on the same phone by simply activating a second service and/or inserting a SIM with a different subscriber number in the second SIM port 246/248.

Dual Number Single SIM (DNSS)

Figure 4A:
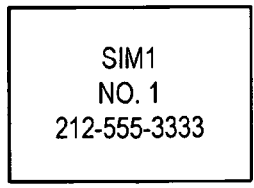
FIGS. 4A and 4B respectively illustrates subscriber modules that provide individual subscriber numbers and a single subscriber module that provides two subscriber numbers, according to two alternate embodiments of the invention.
Figure 4A:
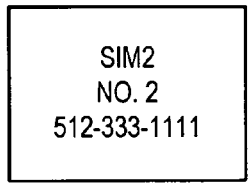
Figure 4B:
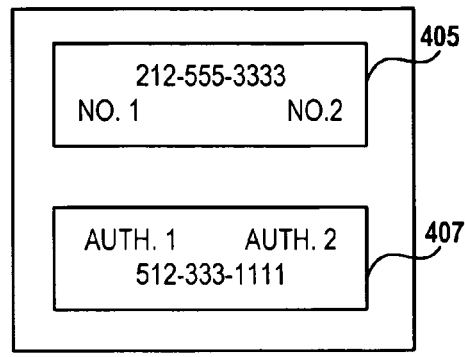
Figure 4C:
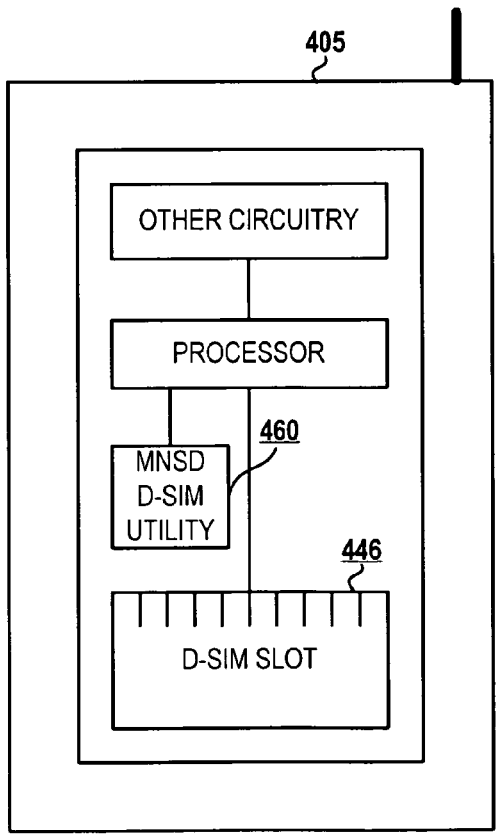
FIG. 4C is a block diagram illustrating and exemplary DNSD phone with a single, dual number subscriber module providing both subscriber numbers according to one embodiment of the present invention.

In yet another embodiment, a single subscriber module may be provided that is itself programmed to support/enable multiple subscriber numbers. Since the SIM card is a circuit that operates as the functional subscriber configuration logic for the particular phone in which it is inserted, a dual SIM function card provides two separate subscriber configuration functions as described below. As shown by FIG. 4B, Dual-number SIM (D-SIM) 400 includes programmable logic 405 for supporting a first subscriber number. Additionally, D-SIM 400 also comprises second programmable logic 407 for supporting a second subscriber number. Programmable logic 405/405' may be a single logic block with code required to support both subscriber numbers 410/415. Thus, unlike the two SIMs of FIG. 4A required for the above described DNSD phones, a single D-SIM 400 is placed within enhanced DSND-G2 phone 405 of FIG. 4C, which is designed with a SIM slot 446 to receive a special subscriber module configured similarly to D-SIM 400.

In one embodiment, D-SIM 400 is the same shape and size as a conventional SIM allowing D-SIM 400 to be utilized within a conventional cellular phone device. When D-SIM 400 is inserted into the cellular phone, however, the control logic of the cellular device may required additional software or software upgrade to a special dual number support control logic (MNSD D-SIM utility 460) to enable the cellular phone to access one (or both) of the subscriber numbers (and associated dual number functionality) available on D-SIM 400. In such circumstances, only a first number is initially activated on the cellular phone when D-SIM 400 is inserted into a SIM slot of a DNSD cellular phone without the associated D-SIM support software upgrade. Thus the D-SIM may be programmed with a first subscriber number when purchased but is later programmed for the second subscriber number post-purchase. This enables the user to decide which service to utilize for the second built in SIM at the time the user desires to activate the second number.

Primary Number Designation and Support

With the two circuits or single circuit supporting two different numbers, one subscriber number is considered a primary number and the other number a secondary number, in one embodiment. The primary number designation allows that number to be given priority when access to both numbers is being arbitrated for. That is the primary number functions are considered default functions and are displayed on the cellular phone display. These primary number functions may override those of the secondary number functions when calls are simultaneously received for both subscriber numbers. In such instances, the designated primary number rings while the voicemail option of the secondary number may be automatically triggered. Thus, the call being received by the secondary number is sent directly to voicemail when the primary number is being utilized to conduct a present communication or is receiving a call.

In one embodiment, a user designates which number is the primary number. For example, the user may designate a number at which business calls are received as the primary number with the number receiving personal calls designated as the secondary number. Further, the user receives an automatic signal of incoming calls on the primary number when the user is on a call using the secondary number. Conversely, calls received on the secondary number (e.g., personal calls) are routed directly to voicemail while the user is on a call with the primary number. In one embodiment, the number assigned to the first circuit is automatically marked as the primary number (also referred to herein as the "active" number). As later described, one embodiment allows the user to designate, by menu selection, which number is the primary number and which number is the secondary number, as well as set/establish other options in handling both numbers.

Functionality and Features

Notably, various features of the invention are provided as software code stored within memory or other storage and executed by processor(s) of the cell phone. For simplicity, the collective body of code that enables the MNSD features are referred to herein as MNSD/DNSD utility. As utilized herein, a utility may be a hardware utility or software utility or a combination of both hardware and software components. In actual implementation, the MNSD utility may be added to existing menu and functional code to provide the support and functions associated with having multiple subscriber numbers on a single device.

Although not required, certain features of the invention are described in the general context of computer-executable instructions, such as program modules, being executed by a processor of the cell phone. Generally, program modules include routines, programs, objects, components, data structures, etc., that perform particular tasks or implement particular abstract data types.

MNSD/DNSD Utility

MNSD utility includes the logic (perhaps in the form of instruction code) that enables all of the functionality of a MNSD phone, some of which are user accessible via alphanumeric keypad, other selection buttons. MNSD logic further provides a menu option/function that, when selected, provides a graphical user interface (GUI) on the display device of the cell phone, which further supports completion by the user of several other functions, including: (1) enabling set-up of the various numbers on the cellular phone; (2) enabling set-up/selection of a primary number from among the available numbers; (3) enabling/disabling particular ones of the numbers (useful when traveling outside of usage area for a number to avoid roaming and other charges or interference with different frequency signals when in another country, for example); (4) setting up call waiting; voicemail; and (5) other phone options for each number individually and/or relative to each other, as described herein. In one embodiment, the displayed menu option may provide selections for only the subscriber number that is currently active.

In one embodiment, DNSD utility also enables a user defined identification of each phone number for use when displaying a received call. For example, a user who has two businesses may utilize the single phone, with each number assigned to a separate one of the two businesses. The user then programs the first number as business1 (e.g., "realty business") and the second number as business2 (e.g., "personal trainer"). Calls received on the number related to the business1 causes the utility to generate a display of "realty business" on the display screen, while calls received for business2 are appropriately signaled with a display of "personal training."

The MNSD utility also allows the user to program different rings for each number so that the rings are distinguishable to the user, who can easily make an association of whether a call is business or personal based on the audible ring. The user does not have to physically pick up and view the phone (or run to the phone if located at a distance away) to know if the call being received is a business call or a personal call or a call to a first business or a second business. The user may thus elect not to answer a particular type (business or personal) call based on the type of ring.

In one embodiment, MNSD utility also displays via the (GUI on the) display device an indication of which particular phone number is currently being utilized or is set as a primary number. The MNSD utility also enables a call waiting functionality, whereby an incoming call on a first/primary (or second/secondary) number is indicated on the display device along with a specific notification to which subscriber number the incoming call is being received for. In this way, an incoming call on the same subscriber number would be distinguished from an incoming call on the other subscriber number. This enables the user to selectively determine whether to answer the incoming call.

In one implementation, the user selects which one of the numbers to utilized when placing a call from the cell phone. Once that number is selected, the dialed number indicates (via caller ID) the call is being made for that particular number (rather than the second number), and the user's cell phone also indicates to the user that the call is being made by that number. Similarly, when a call is received, the display indicates which one of the numbers is being called, so that the user is made aware whether the call is to the first subscriber number or to the second subscriber number.

Another functionality of the DNSD utility enables the user to place one of the phone numbers in a hibernation state so that all calls received for that number during a preset time period are instantly sent to the voicemail associated with that phone number. In this manner, a number that is a personal number may be placed in hibernation mode during business hours. Also, the functionality that allows for call waiting may be limited to permit call waiting while using the personal number if a subsequent business call is received on the business number. Call waiting is however disabled when on the business number if a call is received by the personal subscriber number.

Handling Incoming Calls

Figure 5A:
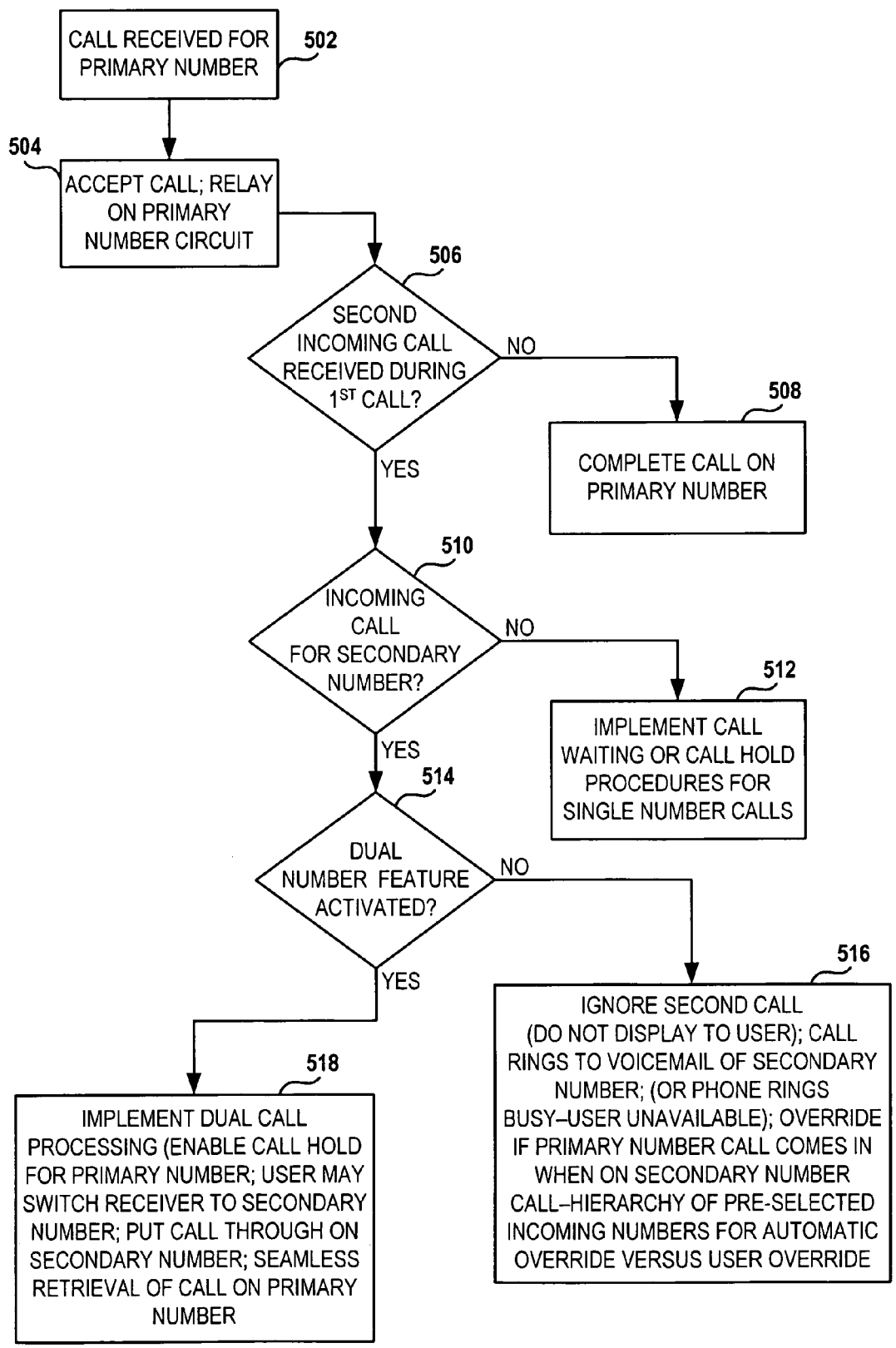
FIGS. 5A and 5B are flow charts representing two alternate methods of processing received calls on a first subscriber number while conducting a call on a second subscriber number using a DNSD/MNSD phone according to embodiments of the invention.
Figures 1, 5B:
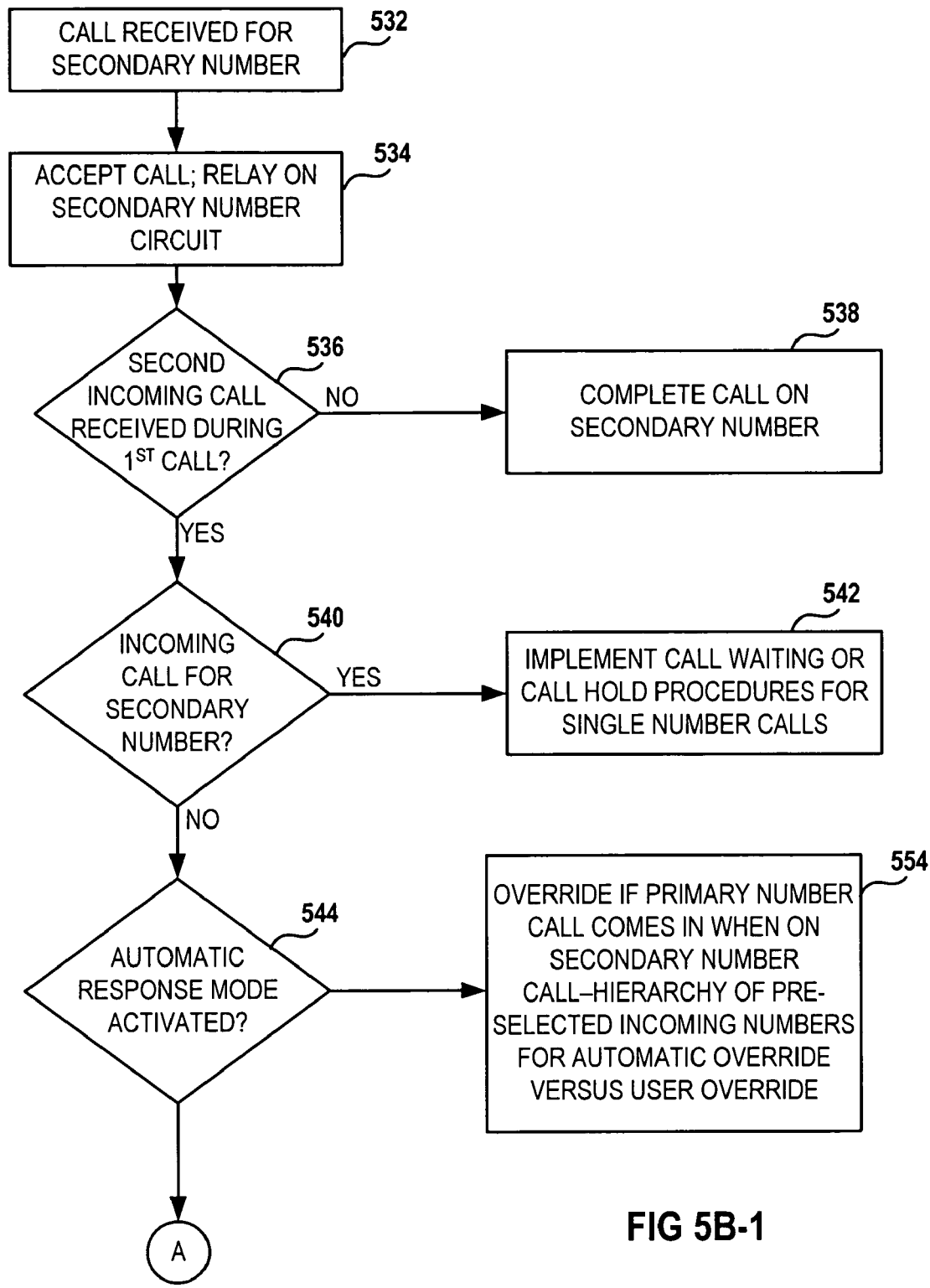
Figures 2, 5B:
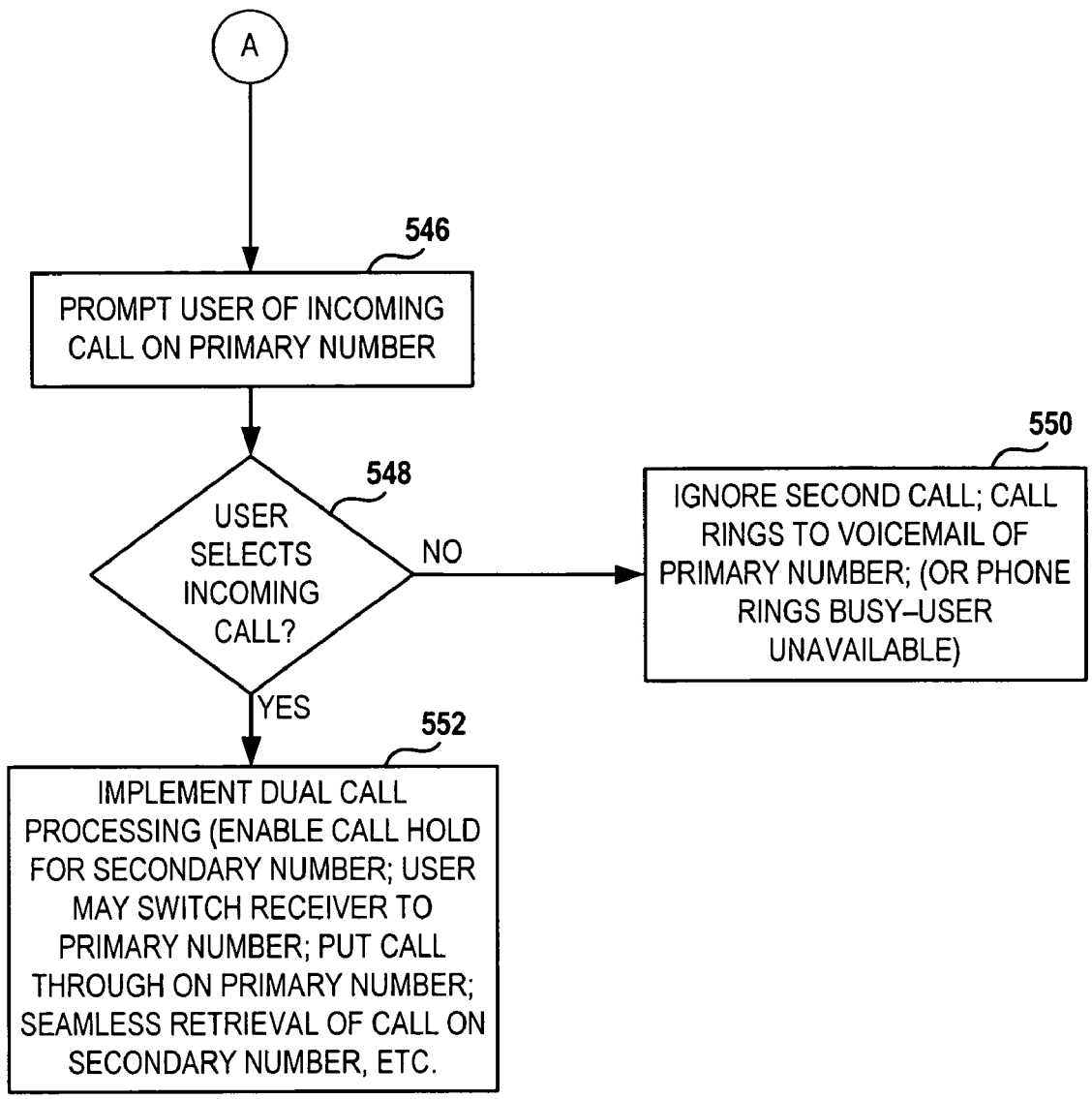

Referring now to FIGS. 5A and 5B, there are illustrated two flow charts of alternate methods by which DNSD utility responds to receipt of an incoming call on the second subscriber number, while conducting a first call on the first subscriber number. The method of FIG. 5A begins at block 502 at which a first call is received on the primary number. At block 504, the subscriber accepts the call, which is relayed on the primary number's circuit. The phone's processor checks, at block 506, whether the subsequent call is received while the communication of the first subscriber number is ongoing, and if not, the call is completed on the primary number, as indicated at block 508.

When a subsequent call is received while the call on the primary number is ongoing, a check is made at block 510 whether the incoming call is for the secondary number. If not (i.e., the subsequent call was received on the primary number), the processor implements pre-programmed call waiting or call hold features, as shown at block 512. However, assuming the incoming call is for the secondary number, a check is made at block 514 whether the dual number enabled features of the MNSD utility have been activated/pre-set. When the dual number enabled features have not been preset, the processor, executing the MNSD utility, initiates one or more of a series of actions that enables the ongoing call on the primary number to be un-interrupted by a call received on the secondary number. Among these actions/features, as indicated by block 516, are the following: (1) send second call directly to voicemail of the secondary subscriber number; (2) prevent display/signal of incoming call on secondary subscriber number; and (3) provided incoming call with busy ring, or with a "presently-busy, will call back" type response.

These "presently-busy, will call back" responses enables the caller to be made aware that the recipient is on a business call and will return the call when the recipient completes the business call. This, more information is provided other than the conventional busy tone or voicemail. In one embodiment, a special selection feature (e.g., selection button 652 of FIG. 6) enables the user to selectively issue the "presently-busy, will call back" response to the incoming call. In another embodiment, this feature is tied to pre-selected numbers stored in the phone book such that subsequent calls from that number is automatically given this "presently-busy, will call back" response when on a call using the primary number.

Returning to FIG. 5A, if it is determined at block 514, however, that the dual number feature of MNSD utility is activated, then, at block 518 the processor initiates a different series of actions to enable seamless call hold and call waiting processes with the first call relative to the second call. In this scenario, the number of the incoming call is signaled to the user on the phone's display, as is shown within FIG. 6, along with indication 640 ("S" for second number in the illustrative embodiment) that the subsequent incoming call is on the secondary number.

As further stated in block 516, the MNSD utility enables an override of these settings when he reverse sequence of calls is received (as further illustrated by FIG. 5B, described below). That is, when a subsequent call is received on the primary number while a prior received call is ongoing on the secondary number, the MNSD utility dynamically provides a different set of responsive actions. This enables the call hierarchy assigned to the pre-selected (default or user-selected) primary number that is given preference in use of the phone resources. This allocation assumes, for example, that the primary number is a business number and thus receives business calls, while the secondary number is a personal number, which receives less important business calls.

Of course alternate embodiments are contemplated in which specific ones of the incoming personal numbers are given "priority" status. That is, when the number is stored to the phone book, a separate status entry is provided by which the user can indicate that the particular number (whether business or personal) has priority and should always be signaled to the user as an incoming call when received by the phone. That is a subsequent, priority number call received for the secondary number is not treated as provided in block 516, but rather given the processing provided in block 518 or perhaps a more advanced processing, as is described below.

FIG. 5B illustrates the inverse process when a subsequent call is received on the primary number while a prior call is ongoing on the secondary number. Blocks 532, 534, 536, 538, 540 and 542 have similar descriptions as corresponding blocks 502, 504, 506, 508, 510 and 512 of FIG. 5A and are thus not described here. Beginning at decision block 540, when the subsequent incoming call is for the primary number (or a priority number, as described above), a determination is made at block 544 whether the MNSD utility has been preset for dynamic response. When the utility has not been preset for automatic answer mode, the user is automatically prompted/ signaled of the incoming call on the primary number, as shown at block 546. Of course, with the inverse sequence of calls, the displayed number of the subsequent incoming call on display device of FIG. 6 would be tagged with a "P" (for primary—or perhaps "Pr" for priority, in some instances) indication 640 that the subsequent incoming call was being received on the primary number (applicable to some embodiments, where automatic switch over features are not activated by MNSD utility). The particular symbol utilized/provided may changed depending on implementation.

Returning to FIG. 5B, a check is then made at block 548 whether the user selects to answer the incoming call. When the user elects not to answer the incoming call, the call is ignored and routed to the voicemail of the primary number as indicated at block 550. The calling number may later be signaled to the user as a missed call. Otherwise, the user selects to answer the incoming call and the processor implements the dual call processing features of call hold and call waiting, etc. as indicated within block 552.

Returning now to decision block 544, at which when the automatic response mode is preset by MNSD utility, the processor initiates a dynamic override function as indicated at block 554. This function activates to seamlessly transition the phone resources and the user to the incoming subsequent call, while placing the prior call on hold or in a suspended state. This mode maybe applied to priority numbers as well as calls received on the primary number. Different embodiments may be provided for placing the prior call in a hold or suspended state including, those described in the section below.

Seamless Conference Calls on DNSD Phones

With conventional phones, when a user receives or makes a call on two different phone devices and then desires to link the two calls (i.e., communicate with both parties on the two numbers in a single conversation at the same time), the use has to first hang up one of the calls, activate a conference feature on the next phone and call back the other individual using the first phone. Since both phones are individual devices, there is no way of conducting a conference call originating on different phones (and phone numbers) with existing phones, whether wireless or wired (e.g., PSTN). With the MNSD phones, however, the MNSD utility includes logic for enabling seamless conferencing via both subscriber numbers connected to different parties. This feature enhances the ability of connecting parties who originated separate calls (or to whom separate calls were made) on the separate subscriber numbers without having to utilize a single number link/conference feature, as is conventionally required.

Bi-furcated Phone Book

According to one embodiment, each subscriber number in the DNSM phone comprises its separate phone book, stored within the corresponding SIM and/or the phone's memory. In a first implementation, the phone book of the currently active phone number is displayed when phone book option is selected within the menu. Similarly, in one embodiment, selecting the menu option for the list of last calls made and received displays the calls associated with the currently active number (rather than all calls generally across the different subscriber numbers).

Further in one embodiment, a navigational affordance is provided that enables the user to actually toggle between phone books from the menu. When the user selects the menu option to open a phone book, the first phone book associated with the currently active number opens up. The user may then scroll through or navigate through the phone book and make changes and or additions to that phone book. A menu option is presented, while in the display for the first phone book, to toggle/switch to the next subscriber number's phone book. The user selections are monitored to determine whether the user selects the option of toggling to the next subscriber number's phone book. If the user has selected that option, the MNSD utility loads up the next subscriber number's phone book for display to the user.

When the user selects a number from the displayed phoned book to dial, the MNSD utility initiates the dialing of the selected number from the subscriber number associated with the phone book in which the selected number is stored. In this way, the phone books default to initiating calls via their respective subscriber numbers. In one embodiment, also, when a number is manually entered by the user, the utility determines to which subscriber number's phone book (if any) the entered number is stored, displays the particulars associated with the number (name, etc.), and automatically initiates the call from the subscriber phone number corresponding to the phone book in which the entered number is stored.

When a call is completed to a number not yet stored within either subscriber number's phone books, the MNSD utility prompts for storage of the number and provides the user the option of storing the number in one of the phone books (e.g., on the SIM of a particular subscriber number) or in a general phone book accessible to both subscriber numbers. A default for such storage will be the subscriber number that is active or the subscriber number utilized to generate or receive the call to/from the number being stored. When numbers are stored in the general phone book, request for phone book information from either number will merge the phone book information from the general phone book with the specific numbers saved on the particular number's SIM. Also, with the embodiment that allows numbers to be generally stored and accessed by either phone book, the currently active number is utilized to initiate any calls made to the generally-stored number.

Priority Numbers and Override

One embodiment enables the user to select certain stored numbers (within the phone books) to assign a priority value to. The priority determines how calls originating from that number is treated relative to other calls received on the MNSD phone. During set up and storage of the number, one of the entry options provided is a priority entry. This entry may provide two or more selections. As an example, the priority entry may be selected from among "standard", "elevated", and "override". The actual names may differ in other implementations. An entered phone number defaults to standard priority when initially entered, indicating that no special treatment is afforded the number. An elevated priority may enable calls from the number to be signaled during an ongoing call (when that feature is disabled for calls from numbers with standard priority, as when a call is received during an ongoing business call on the primary subscriber number), so that the user may elect to answer the call. An override priority enables the automatic override of an ongoing call by a call received from a number tagged with the override priority. The incoming call is connected and the prior ongoing call is placed on hold, with some indication that the user has left the call. In one embodiment, the override capability of calls originating from these numbers may depend on whether the override call is received while on a call using the primary number or the secondary number. In one embodiment, override only occurs during an ongoing call on the secondary number. In another embodiment, override maybe programmed to occur for any calls.

The override functionality enables certain numbers to receive immediate response from the MNSD phone user. For example, a mother may program her child's day care or her child's cell phone as an override number so that any calls received from those numbers are considered of highest importance, regardless of the present ongoing calls being conducted. To enable a seamless transition away from the initial/prior call when the override feature is triggered, one of several methods are provided y MNSD utility. Among these methods are the following:

provide a pre-recorded message that the user has left the call (e.g., "I'm sorry, this call has been suspended (or terminated), Mr. _____ will resume the call (or call you back shortly)");

provide a "please wait/hold" recording repeated at some interval;

provide a "musical interlude" to alert the person on the other end that the user is no longer on the call;

In one embodiment, the number of the last call is automatically recorded, while the call is placed on hold. If the person hangs up on the other end, the number is signaled on the display for the user to re-initiate the call as soon as the subsequent call is completed. If the person does not hang up, however, the original call is continued when the user selects to go back to that call or when the call on the subsequent number is completed.

Specific Voicemail Features

In order to handle voicemail features of both numbers, DNSD utility provides one of two voicemail handling functions. In the first embodiment, the DNSD utility displays voicemail for both numbers separately on the display device (see FIG. 6). That is if both numbers have voicemail stored, DNSD utility displays two separate voicemail indicators 660/662, one for each of the numbers. The user may then choose to enter and retrieve voicemail of one or both of the numbers.

Figure 6:
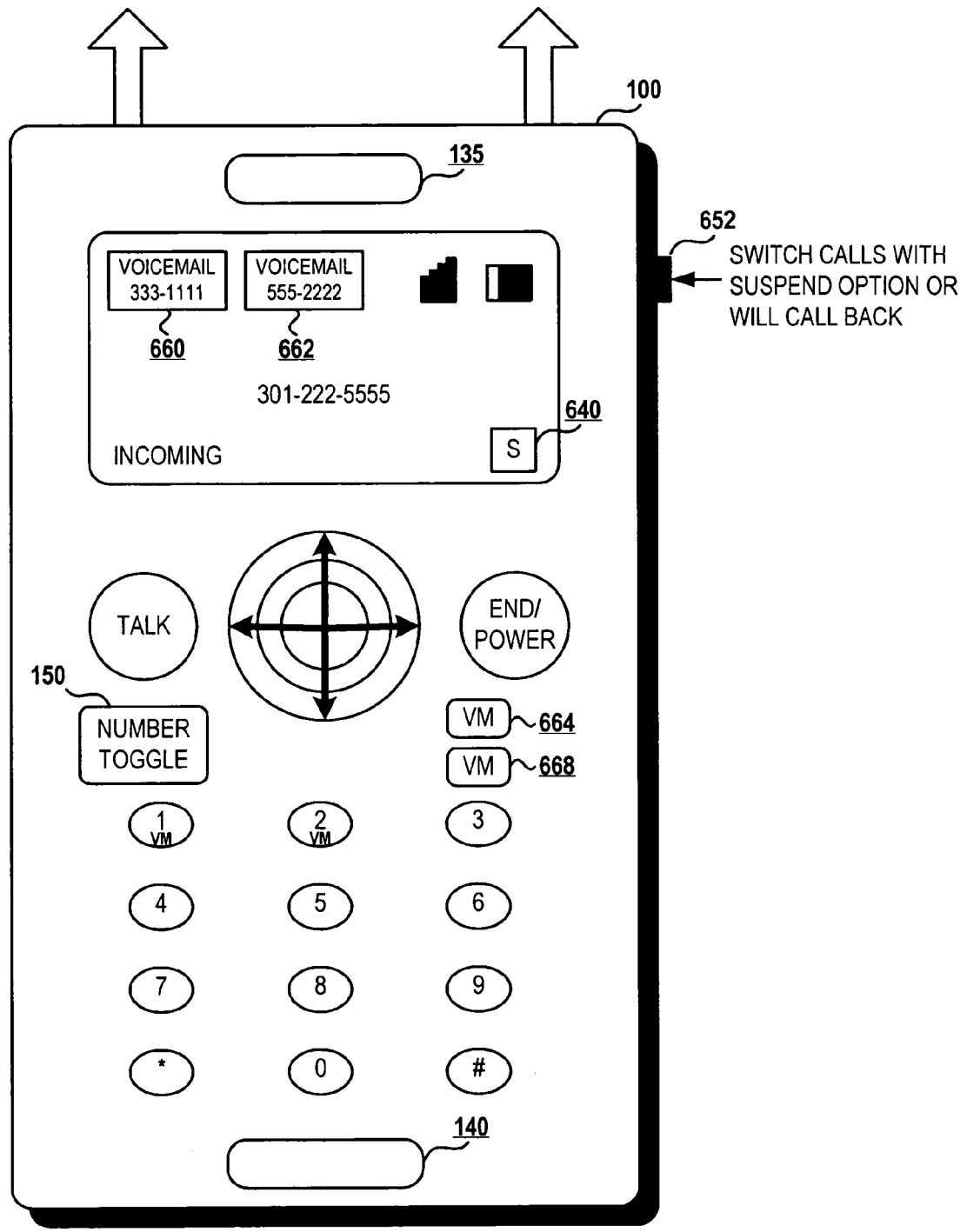
FIG. 6 is a block diagram illustrating another configuration of a DNSD phone with a special toggle button for switching between subscriber numbers and voicemail functions in accordance with one embodiment of the invention.

Selection of which number to retrieve voicemail from is a MNSD utility function that enables the user to check voicemail for a specific subscriber number. As illustrated by FIG. 6, one embodiment provides two voicemail buttons, which may be separate buttons 664/668 or two of alphanumeric buttons (1 and 2, for example) pre-programmed to open a specific voice mailbox when depressed for a pre-set length of time. Of course, another embodiment could provide a single voicemail button (e.g., 664) that when depressed opens up a menu option to select which of the two voice mailboxes to enter.

Figure 7:
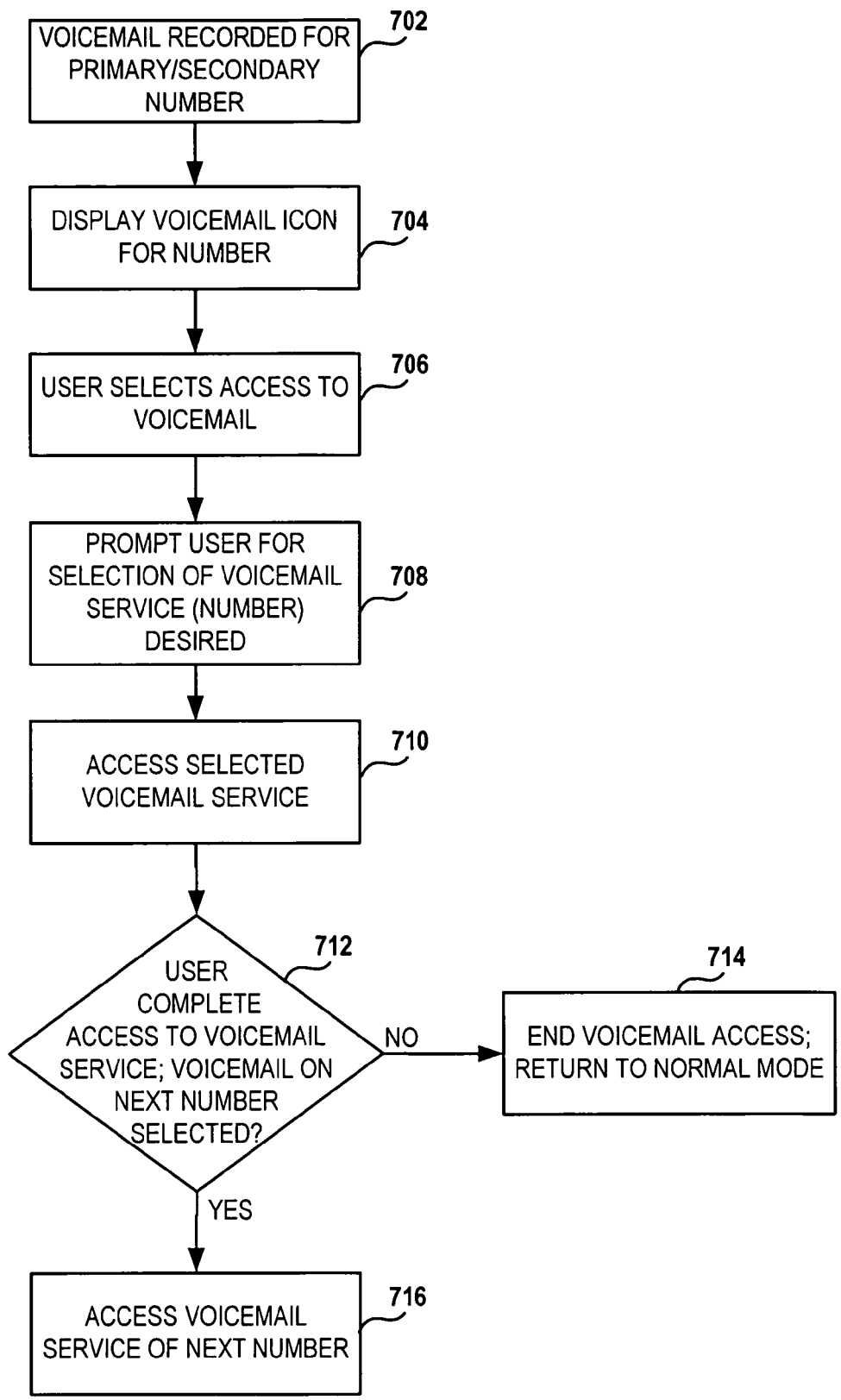
FIG. 7 is a flow chart of the process by which voicemail is accessed on a DNSD according to one embodiment of the present invention.
Figure 8:
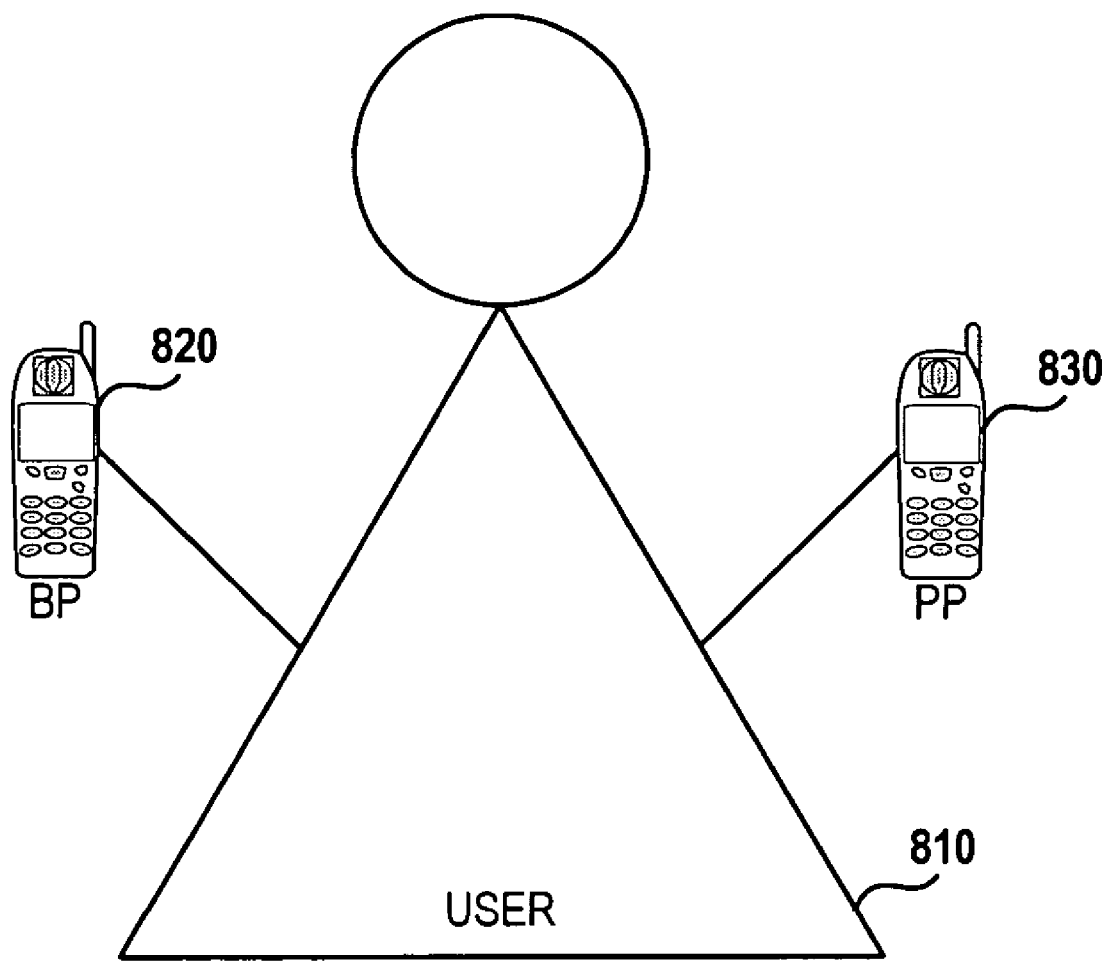
FIG. 8 illustrates a prior art approach to providing a single user with two or more cellular subscriber numbers.

FIG. 7 illustrates one embodiment of the process by which access to voicemail in a DNSD phone is completed. The process begins at block 702, which shows that a voicemail is recorded for one of the subscriber numbers. Once the voicemail is recorded, the particular voicemail icon (660/662) is displayed on the phone's display, a shown at block 704. Then, the user later selects access to voicemail by selecting the voicemail button 664 on the phone, as shown at block 706. The present embodiment assumes the MNSD phone has a single voicemail that displays a menu option to select which voicemail to access. Of course, direct access to a particular one of the voicemails may be completed via one of the various methods provided (as described above with reference to FIG. 6), in alternate embodiments.

Once the use selects the voicemail button 664, the user is prompted (audibly or via display and by any method available for the particular phone or the cellular service) with a request to select which subscriber number to check voicemail for, as indicated at block 708. This prompt assumes that the user may want to setup voicemail options for a subscriber number even when there is no voicemail available for the subscriber number. Otherwise, no prompt would be required since the MNDS utility would automatically route the user to the voice mailbox that has voicemail or messages therein.

Notably, in one embodiment, the user may bypass the request for selection of a voicemail to enter by first selecting the primary or secondary number on the display. Once a number is selected, access to the voicemail service for that number is provided when the user initiates a voicemail access (without any prompts from MNSD utility). Accordingly, an alternate method may display and provide voicemail selection function only for the number that is currently active on the display device. With this alternate embodiment, the voice mailbox of the active subscriber number is automatically opened, and the user then has to toggle to the next number (via any of multiple toggling methods described herein) to enter the mailbox of the other number. Any available/stored voicemail for the other number is only signaled on the display when the other number is selected as the active number.

Once the user selects the number in block 708, the user is directed to the voicemail service (service provider) of that particular subscriber number, as depicted at block 710. According to the illustrated embodiment, when the user completes interacting with the first subscriber number's voicemail, control returns to MNSD utility, which prompts the user whether he wishes to check/setup/change the next subscriber number's voicemail (if voicemail exists for that number). Thus, a determination is made at block 712 based on user activity within the first subscriber number's mailbox, whether the user selects the option to go to the voice mailbox of the next subscriber number. If the user selects to go to the next subscriber number's mailbox, then the voicemail service for that second subscriber number is accessed, as shown at block 716. Otherwise, the voicemail access is terminated and the phone is returned to normal mode, as shown at block 714.

Some of the benefits provided by the invention include: (1) business travelers no longer need a separate cell phone for personal calls and business calls; (2) multiple business numbers can be programmed into a single phone device so that a real estate agent who is also a personal trainer can have both business numbers within a single device; (3) user defined display for calls received to distinguish calls from each number; (4) easy programming menu functions to enable user-specific call waiting and other features; (5) With SIM card portability, a traveler may keeps his home phone activated while obtaining a different number for use, all without having to remove the original SIM for his home/primary number.

As a final matter, it is important that while an illustrative embodiment of the present invention has been, and will continue to be, described in the context of a fully functional cellular phone system/device with installed MNSD software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links. An cell phone configured to provide MNSD service could be coupled to a computer system/device executing an MNSD install/download feature that enables download of relevant (or selected) MNSD code on to the cell phone.

While the invention has been particularly shown and described with reference to a preferred embodiment, it will be understood by those skilled in the art that various changes in form and detail may be made therein without departing from the spirit and scope of the invention.

What is claimed is:

1. A single wireless communication device comprising:
a first cellular subscriber number (CSN) enabling wireless voice, multimedia and data communication; and
a second CSN enabling separate wireless voice, multimedia and data communications, operationally supported within the same single wireless communication device; and
means for enabling passive termination of a first wireless communication after an elapsed pre-set amount of time on a second wireless communication, said means for enabling further comprising:
means for automatically generating a please hold message which is communicated on the first wireless communication; and
means, when the first wireless communication reaches a timeout period on hold, for displaying options to the user for handling the first wireless communication from among: switching back to call on the first CSN; automatically issuing a recorded message for a later callback; signaling callback options to the user when the communication on the second CSN ends; storing the phone number of the call being terminated; and leaving a message on a voicemail of the CSN to complete the call.

2. The wireless communication device of claim 1, further comprising: at least one memory component on which is programmed (a) the first CSN and functionality associated with the first CSN and (b) the second subscriber number and functionality associated with the second subscriber number; wherein when more than two CSNs are supported by the same device, each CSN and associated functionality is programmed on one of said at least one memory component.

3. The wireless communication device of claim 1, further comprising: a first memory component on which is programmed the first CSN and functionality associated with the first CSN; a second memory component on which is programmed the second CSN and functionality associated with the second CSN; and a multiple number single device (MNSD) utility which enables selective use of the first CSN and associated functionality and the second CSN and associated functionality by accessing the corresponding memory component, wherein said MNSD utility further supports concurrent use of non-conflicting functions of both the first CSN and the second CSN.

4. The wireless communication device of claim 1, further comprising: a dual transceiver configuration having a first transceiver function associated with the first CSN and a second transceiver function associated with the second CSN; and control means for enabling the dual transceiver configuration to concurrently support two subscriber services, each corresponding to one of the first and second CSNs.

5. The wireless communication device of claim 1, further comprising: a wireless transceiver that supports receipt and transmission of wireless communication; first configuration logic for associating the wireless transceiver with the first CSN based on a first set of parameters associated with a most recent wireless communication on the device, wherein said parameters identify the communication as belonging to the first CSN; and second configuration logic for associating the wireless transceiver with the second CSN based on a second set of parameters associated with the most recent wireless communication on the device, wherein said parameters identify the communication as belonging to the second CSN.

6. The wireless communication device of claim 1, further comprising: circuitry that simultaneously supports multiple subscriber numbers comprising at least the first CSN and the second CSN, said circuitry comprising: a first wireless phone circuitry supporting the first CSN; overlapping second wireless phone circuitry supporting the second CSN; and a control mechanism that enables wireless communication functions to and from both the first CSN and the second CSN and localized navigational and menu functions to support both the first CSN and second CSN; a graphical display that provides a user interface with displayed features and content of a menu utility of the wireless device, said displayed features comprising a display of one of the first CSN and the second CSN that is currently active within the wireless device; and control logic for adjusting content of the user interface based on which of the multiple subscriber numbers is currently active.

7. The wireless communication device of claim 1, further comprising: a numerical keypad and navigation and menu buttons for user selection; and a number toggle button that enables the user to selectively toggle between the first CSN and the second CSN, wherein the selection of the first CSN displays the first CSN and other pre-set display features of the first CSN on a display of the device and selection of the second CSN displays the second CSN and other pre-set display features of the second CSN on the display.

8. The wireless communication device of claim 1, further comprising: a processor; a memory component; and a multiple number single device (MNSD) utility, which when executed by the processor provides the functionality to support full wireless communication via both said first CSN and said second CSN, wherein said utility enables at least partial, concurrent, wireless communication with one of the first and second CSNs currently with full wireless communication functionality on the other one of the first and second CSNs.

9. The wireless communication device of claim 8, wherein the MNSD utility comprises: means for enabling a user to select one of said first CSN and said second CSN as a primary number, wherein one of said first CSN and said second CSN is initially set as the default primary number at manufacture/configuration of the device and the user selection of the other CSN as the new primary number overrides the original default primary number setting; means for enabling power-up of the wireless communication device to default to the primary number; means, when only a single one of the CSNs is displayed on the device at a time, for automatically displaying the primary number following power-up; and means for enabling selection of a new primary number following an initial power up of the device, wherein said selection is thereafter completed via a menu selection or on set up of a new CSN on the device.

10. The wireless communication device of claim 1, further comprising: means for enabling a toggling between the first CSN and the second CSN by a user, wherein the selection of the first CSN displays the first CSN and other pre-determined display features of the first CSN on a display of the device and selection of the second CSN displays the second CSN and other pre-determined display features of the second CSN on the display means for providing a selectable affordance on the user interface that enables the user to select one of the first subscriber number and the second subscriber number to perform a next user function, said user function being one or more of placing a call, accessing associated voicemail, accessing a menu item associated with the subscriber number, and accessing a phone book associated with the subscriber number; wherein, when the user selects the particular subscriber number, the communication device comprises means for performing a next user activated/selected function for the selected active CSN; means for toggling between the first and second CSNs to enable communication features with a selected one of the first and second CSN that is toggled to; means for displaying the currently active CSN of the first and second CSNs, wherein the currently active CSN represents the CSN from which outgoing calls originate and to which selected menu functions apply; and means for automatically initiating each originating wireless communication from the CSN that is currently the active CSN on the wireless communication device.

11. The wireless communication device of claim 1, further comprising: means for assigning priorities to the CSNs, wherein the priority indicates a method of handling overlapping calls received by the first CSN and the second CSN; and means, when the second wireless communication is received for the second CSN while the communication is ongoing with the first CSN and responsive to a user selection to respond to the overlapping wireless communication, for enabling the user to place the wireless communication with the first CSN on hold and activating the wireless communication with the second CSN; wherein when the second CSN is assigned higher priority than the first CSN, said means for placing the first CSN on hold further comprises: means for providing a pre-set signal that provides unequivocal feedback to the user that the second wireless communication being received on the second CSN is a higher priority communication; means for seamlessly responding to and conducting the second wireless communication; and means for enabling passive termination of the first wireless communication after an elapsed pre-set amount of time on the second wireless communication.

12. The wireless communication device of claim 1, further comprising: means for enabling storage of a first phonebook corresponding to the first subscriber number to a first memory component; and means for concurrently storing a second phonebook corresponding to the second subscriber number to a second memory component, both components being local to the wireless device; and means for storing particular configuration information related to the particular subscriber number within a respective entry on the memory component, such that each number may comprise or exhibit unique configuration.

13. The wireless communication device of claim 1, further comprising: means for defaulting the first subscriber number as the primary number and the second subscriber number as the secondary number; means for enabling user selection of one of the first subscriber number and the second subscriber number as a primary number; and means, when an incoming communication is received for the primary number, while a first communication is ongoing with a secondary number, for dynamically initiating a primary number response protocol.

14. The wireless communication device of claim 1, wherein said first wireless number is provided by a first service provider and the second wireless number is provided by a second service provider, wherein the first service provider provides one of a GSM, a CDMA, and a TDMA system protocol while the second service provider provides one of a GSM, a CDMA, and a TDMA system protocol, wherein when the device supports multiple different protocols of wireless communication, said means for selecting one of the CSNs for completing wireless communication comprises: means for dynamically switching to a protocol supported by the subscriber number from among the multiple protocols supported by the device.

15. The wireless communication device of claim 1, further comprising: a first subscriber identification module (SIM) and a second subscriber identification module (SIM), each providing functionality of a respective one of the first CSN and the second CSN.

16. The wireless communication device of claim 1, further comprising: when the device is a multiple port GSM-configured device, at least two ports for receiving two different SIMs, each SIM configured to provide the functionality of one of the CSNs; when the device is a single port GSM-configured device, a single SIM port for receiving a single D-SIM card that provides the functionality of the two CSNs and logic within the MNSD module to support the single D-SIM card; and when the device is a GSM-CDMA configured device, a single SIM port for receiving a single SIM card configured to provide the functionality of the first CSN with GSM operations and circuitry for programming functionality of the second CSN for CDMA operations.

17. A dual SIM card (D-SIM) configured to operate within a single port GSM-configured device of claim 16.

18. A method for manufacturing the wireless communication device of claim 1, the method comprising: configuring within the wireless communication device a first circuitry to support the first CSN; configuring within the wireless communication device a second circuitry to support a second CSN; encoding within a processor chip of the wireless communication device a control logic that enables wireless communication for both the first CSN and the second CSN, while preventing concurrent utilization of features from both CSNs that would result in interference of an ongoing communication.

19. A wireless communication device comprising:
a first cellular subscriber number (CSN) enabling wireless voice, multimedia and data communication; and
a second CSN enabling separate wireless voice, multimedia and data communications, operationally supported within the same single wireless communication device; and
means for dynamically initiating a primary number response protocol when an incoming communication is received for the primary number, while a first communication is ongoing with a secondary number, wherein said means for initiating said primary number response protocol comprises:
means for activating a silent alert feature to inform the user that the second communication is being received for the primary number, and when automatic switch-over option has been pre-set for the primary number, said device comprises: means for immediately placing the first communication on hold; means for playing a pre-recorded please hold message over the first communication; means for automatically initiating the second communication on the primary number; when the automatic switch-over has not been preselected, said device comprises means for: silently signaling the user of the incoming call and call number identification (ID); providing a switch over affordance option on the user interface to enable the user to switch between the ongoing communication and the incoming communication; and enabling said call to be treated as a missed call wherein the call rings for a pre-set number of times and when the user does not switch over within the preset timeframe, the call is forwarded to the voicemail of the secondary number.

20. A wireless communication device comprising:
a first cellular subscriber number (CSN) enabling wireless voice, multimedia and data communication; and
a second CSN enabling separate wireless voice, multimedia and data communications, operationally supported within the same single wireless communication device; and
means, when an incoming communication is received for a second subscriber number, while a first communication is ongoing with a primary number that is set up to not be disturbed by calls received on the secondary number, for: forwarding the incoming communication to a voicemail of the second subscriber number; signaling a receipt of an incoming communication and associated voicemail, if recorded, to the user after the completion of the first communication; providing a call back signal indicating the termination of the ongoing first communication during a switch-over period; and enabling automatic redial and call back by providing a user prompt to select a call-back/resume-call affordance on the user interface.

21. The wireless communication device of claim 20, further comprising a displayable menu that includes user selectable features comprising: means for recording a playback message for on-hold during a switch-over to a primary number; means for providing a call back message that is displayed on the user interface after a primary caller is terminated during the switch over period to a primary call.

22. In a wireless communication device, a method comprising:
enabling a first wireless communication on the wireless communication device via a first subscriber number based on received first communication parameters associated with a most recent wireless communication that identifies the communication as belonging to the first CSN; and enabling a second wireless communication on the wireless communication device via a second subscriber number based on received second communication parameters associated with the most recent wireless communication that identify the communication as belonging to the second CSN; wherein the first and second CSNs are simultaneously supported by the single wireless communication device and selectively enabled based on the received first and second communication parameters;

establishing a wireless communication (transmission and reception) via a first subscriber number supported by the wireless device;

receiving a signal for initiating a second wireless communication via a second subscriber number supported by the wireless device; and responsive to a user selection of a menu option, placing the wireless communication with the first subscriber number on hold and activating the wireless communication with the second subscriber number;

when the second subscriber number is assigned higher priority than the first subscriber number:

generating a please hold message on the first wireless communication;

activating the second wireless communication;

indicating the priority of the second wireless communication to a user of the wireless device;

enabling termination of the first wireless communication;

when the first wireless communication reaches a timeout period, displaying options to the user for handling the first wireless communication from among return to call and issue recorded message for callback;

signaling callback options to the call origination point, including recording the cell number, leaving a message on voicemail, requesting automatic callback on completion of the second wireless communication;

providing a specialized signal that provides unequivocal feedback to the user that the second call is a higher priority call received on the second subscriber number; and displaying the origination number (station identifier (ID)) of the second wireless communication.

23. The method of claim 22, further comprising: displaying a first subscriber number during use of the wireless device to conduct a communication with the first subscriber number; displaying a second subscriber number during use of the wireless device to conduct a next communication with the second subscriber number; and switching between the displaying of the first subscriber number and the displaying of the second subscriber number when the next communication is initiated and vice versa.

24. The method of claim 22, further comprising: displaying both the first subscriber number and the second subscriber number during standby mode; providing a selectable affordance on the user interface that enables the user to select one of the first subscriber number and the second subscriber number to perform a next user function, said user function being one or more of placing a call, accessing associated voicemail, accessing a menu item associated with the subscriber number, accessing a phone book associated with the subscriber number, wherein, when the user selects the particular subscriber number, the method comprises performing a next user activated/selected function for (only) the selected particular subscriber number.

25. The method of claim 22, wherein said first wireless number is provided by a first service providers and the second wireless number is provided by a second service provider, wherein the device supports multiple different bands of wireless communication, wherein the first service provider provides a GSM system configuration while the second service provider provides a CDMA/TDMA system configuration, said method for selecting one of the subscriber numbers further comprising: dynamically switching to a band supported by the subscriber number from among the multiple bands supported by the device.

26. In a wireless communication device, a method comprising:

enabling a first wireless communication on the wireless communication device via a first subscriber number based on received first communication parameters associated with the most recent wireless communication that identify the communication as belonging to the first CSN;

enabling a second wireless communication on the wireless communication device via a second subscriber number based on received second communication parameters associated with the most recent wireless communication that identify the communication as belonging to the second CSN;

wherein the first and second CSNs are simultaneously supported by the single wireless communication device and selectively enabled based on the received first and second communication parameters;

defaulting the first subscriber number as the primary number and the second subscriber number as the secondary number;

enabling user selection of one of the first subscriber number and the second subscriber number as a primary number; and when an incoming communication is received for the primary number, while a first communication is ongoing with a secondary number, dynamically initiating a primary number response protocol;

wherein initiating said primary number response protocol comprises:

activating a silent alert feature to inform the user that the second communication is being received for the primary number; and when automatic switch-over option has been pre-set for the primary number, said method comprises:
immediately placing the first communication on hold;
playing a pre-recorded please hold message over the first communication; and
automatically initiating the second communication on the primary number; and when the automatic switch-over has not been pre-selected, said method comprises:
silently signaling the user of the incoming call and call number identification (ID);
providing a switch over affordance option on the user interface to enable the user to switch between the ongoing communication and the incoming communication; and
enabling said call to be treated as a missed call wherein the call rings for a pre-set number of times and when the user does not switch over within the preset timeframe, the call is forwarded to the voicemail of the secondary number.

27. The method of claim 26, further comprising: recording a playback message for on-hold during a switch-over to a primary number; and providing a call back memo that is displayed on the user interface after a primary caller is terminated during the switch over period to a primary call; and enabling automatic redial and call back by providing a user prompt to select a call-back/resume-call affordance on the user interface.

28. The method of claim 26, further comprising: when an incoming communication is received for the secondary number, while a first communication is ongoing with a primary number that is set up to not be disturbed by calls received on the secondary number: forwarding the incoming communication directly to a voicemail of the second subscriber number; and signaling a receipt of an incoming communication and associated voicemail, if recorded, to the user after the completion of the first communication.

29. A computer program product comprising a computer readable medium and program means on the computer readable medium for enabling the features and functionality of claim 28.

30. A method for providing a service, comprising: integrating a first cellular subscriber number into a cellular device; integrating a second CSN into the same cellular device; and downloading into the cellular device a software utility that enables a multiple-number single device (MNSD) functionality according to claim 28 to support making and receiving calls via both the first CSN and the second CSN on the same cellular device without requiring physical hardware change between uses of the first and the second CSNs.

31. In a wireless communication device, a method comprising:
   enabling a first wireless communication on the wireless communication device via a first subscriber number based on received first communication parameters associated with the most recent wireless communication that identify the communication as belonging to the first CSN;
   enabling a second wireless communication on the wireless communication device via a second subscriber number based on received second communication parameters associated with the most recent wireless communication that identify the communication as belonging to the second CSN;
   wherein the first and second CSNs are simultaneously supported by the single wireless communication device and selectively enabled based on the received first and second communication parameters;
   enabling user selection of one of the first subscriber number and the second subscriber number as a primary number, wherein the number not selected as the primary number is a secondary number;
   wherein when no user selection is received, defaulting the first subscriber number as the primary number and the second subscriber number as the secondary number; and
   when an incoming second communication is received for the primary number, while a first communication is ongoing with a secondary number, dynamically initiating a primary number response protocol, which comprises:
      activating a silent alert feature to signal that the second communication is being received for the primary number; and
      providing a switch over affordance on the user interface of the device that switches between the ongoing first communication and the incoming second communication; and
      when a selection of the switch over affordance is detected, automatically switching over to receive the incoming second communication on the primary number.

32. The method of claim 31, further comprising:
detecting when the incoming second communication goes unanswered for a pre-set timeframe;
enabling said incoming second communication to be treated as a missed call on the secondary number, wherein the call rings for a pre-set number of times and when a switch over to receive the incoming secondary communication is not detected within the preset timeframe, the incoming secondary communication is automatically forwarded to a voicemail of the primary number.

33. The method of claim 31, further comprising:
when the incoming second communication is detected during the ongoing first communication, determining whether an option that enables automatic switch-over has been pre-set for the primary number; and
when the automatic switch-over option has been preset for the primary number:
   immediately placing the first communication on hold;
   playing a pre-recorded please hold message over the first communication; and
   automatically initiating the second communication on the primary number; and
when the automatic switch-over has not been preset, silently signaling a notification of the incoming second communication and call number identification (ID).

34. The method of claim 31, further comprising automatically initiating playback of a pre-recorded on-hold message on the primary number during a switch-over to a secondary number.

35. The method of claim 34, further comprising:
providing a call back memo that is displayed on the user interface after a primary communication is terminated during a switch-over period to the incoming second communication; and
providing a prompt to select a call-back/resume-call affordance on the user interface; and
enabling automatic redial and call back when the call-back/resume-call affordance is selected.

36. The method of claim 31, further comprising:
when an incoming communication is received for the secondary number, while a first communication is ongoing with a primary number that is configured to not be disturbed by incoming communication received on the secondary number:
automatically forwarding the incoming communication directly to a voicemail of the second subscriber number; and
signaling a receipt of the incoming communication and an associated voicemail, if recorded, after completion of the first communication.

37. The method of claim 31, further comprising:
receiving a selection of a higher priority assigned to one of the primary number and the secondary number;
when the second subscriber number is assigned higher priority than the first subscriber number and a second communication is received for the second subscriber number while a first communication is ongoing on the first subscriber number:
   signaling the higher priority of the second wireless communication;
   providing a signal that provides unequivocal feedback that the second wireless communication being received on the second subscriber number has a higher priority than an ongoing communication at the first subscriber number; and displaying the origination number (station identifier (ID)) of the second wireless communication;

connecting the second wireless communication;

enabling termination of the first wireless communication; and when the first wireless communication is not terminated:
  generating a please hold message on the first wireless communication; and
  when the first wireless communication reaches a timeout period while on hold, displaying options for handling the first wireless communication, including: return to call; and transmit a pre-recorded message for callback.

38. The method of claim 37, further comprising:

signaling callback options available to a call origination point, said options including: recording identifying data of the first subscriber number to enable later callback; leaving a message on voicemail of the first subscriber number; requesting automatic callback from the first subscriber number on completion of the second wireless communication.

\* \* \* \* \*